(12) United States Patent
King et al.

(10) Patent No.: US 8,643,695 B2
(45) Date of Patent: Feb. 4, 2014

(54) VIDEOCONFERENCING ENDPOINT EXTENSION

(75) Inventors: Keith C. King, Austin, TX (US); Matthew K. Brandt, Driftwood, TX (US); Wayne E. Mock, Round Rock, TX (US)

(73) Assignee: LifeSize Communications, Inc., Austin, TX (US)

( * ) Notice: Subject to any disclaimer, the term of this patent is extended or adjusted under 35 U.S.C. 154(b) by 630 days.

(21) Appl. No.: 12/712,964

(22) Filed: Feb. 25, 2010

(65) Prior Publication Data

US 2010/0225737 A1    Sep. 9, 2010

Related U.S. Application Data

(60) Provisional application No. 61/157,516, filed on Mar. 4, 2009.

(51) Int. Cl.
*H04N 7/14* (2006.01)
(52) U.S. Cl.
USPC .................. 348/14.08; 348/14.11; 348/14.12; 379/202.01
(58) Field of Classification Search
USPC .................... 348/14.01–14.16; 370/259–271, 370/351–356; 709/201–207, 217–248
See application file for complete search history.

(56) References Cited

U.S. PATENT DOCUMENTS

| | | | |
|---|---|---|---|
| 4,449,238 A | 5/1984 | Lee et al. | |
| 4,686,698 A | 8/1987 | Tompkins et al. | |
| 4,893,326 A | 1/1990 | Duran et al. | |
| 5,003,532 A | 3/1991 | Ashida et al. | |
| 5,014,267 A | 5/1991 | Tompkins et al. | |
| 5,200,989 A | 4/1993 | Milone | |
| 5,239,623 A | 8/1993 | Sato et al. | |
| 5,365,265 A | 11/1994 | Shibata et al. | |
| 5,374,952 A | 12/1994 | Flohr | |

(Continued)

FOREIGN PATENT DOCUMENTS

JP    5181639    7/1993

OTHER PUBLICATIONS

"A history of video conferencing (VC) technology" <http://web.archive.org/web/20030622161425/http://myhome.hanafos.com/~soonjp/vchx.html> (web archive dated Jun. 22, 2003); 5 pages.

(Continued)

*Primary Examiner* — Hemant Patel
(74) *Attorney, Agent, or Firm* — Meyertons Hood Kivlin Kowert & Goetzel, P.C.; Jeffrey C. Hood; Joel L. Stevens

(57) ABSTRACT

In some embodiments, a primary endpoint may receive a request from an endpoint to begin a videoconference and/or may be managing a videoconference with an endpoint. The primary endpoint may determine whether to switch or direct conference communications from one or more endpoints in the videoconference or attempting to connect to the videoconference to a secondary endpoint and may communicate the instructions to the endpoint and/or secondary endpoint. In some embodiments, the primary endpoint may seamlessly pass one or more of the endpoints to the secondary endpoint such that participants in the videoconference may not be aware that a switch has been performed. In some embodiments, the primary endpoint may contact the secondary endpoint and may then pass endpoints to the secondary endpoint. The primary endpoint may also pass configuration information for the endpoints to the secondary endpoint.

21 Claims, 18 Drawing Sheets

(56) References Cited

U.S. PATENT DOCUMENTS

| | | |
|---|---|---|
| 5,382,972 A | 1/1995 | Kannes |
| 5,398,309 A | 3/1995 | Atkins et al. |
| 5,444,476 A | 8/1995 | Conway |
| 5,453,780 A | 9/1995 | Chen et al. |
| 5,473,363 A | 12/1995 | Ng et al. |
| 5,515,099 A | 5/1996 | Cortjens et al. |
| 5,528,740 A | 6/1996 | Hill et al. |
| 5,534,914 A | 7/1996 | Flohr et al. |
| 5,537,440 A | 7/1996 | Eyuboglu et al. |
| 5,572,248 A | 11/1996 | Allen et al. |
| 5,581,671 A | 12/1996 | Goto et al. |
| 5,594,859 A | 1/1997 | Palmer et al. |
| 5,600,646 A | 2/1997 | Polomski |
| 5,608,653 A | 3/1997 | Palmer et al. |
| 5,617,539 A | 4/1997 | Ludwig et al. |
| 5,625,410 A | 4/1997 | Washino et al. |
| 5,629,736 A | 5/1997 | Haskell et al. |
| 5,640,543 A | 6/1997 | Farrell et al. |
| 5,649,055 A | 7/1997 | Gupta et al. |
| 5,657,096 A | 8/1997 | Lukacs |
| 5,684,527 A | 11/1997 | Terui et al. |
| 5,689,641 A | 11/1997 | Ludwig et al. |
| 5,719,951 A | 2/1998 | Shackleton et al. |
| 5,737,011 A | 4/1998 | Lukacs |
| 5,751,338 A | 5/1998 | Ludwig, Jr. |
| 5,764,277 A | 6/1998 | Loui et al. |
| 5,767,897 A | 6/1998 | Howell |
| 5,768,263 A | 6/1998 | Tischler et al. |
| 5,812,789 A | 9/1998 | Diaz et al. |
| 5,821,986 A | 10/1998 | Yuan et al. |
| 5,828,838 A * | 10/1998 | Downs et al. ............... 709/204 |
| 5,831,666 A | 11/1998 | Palmer et al. |
| 5,838,664 A | 11/1998 | Polomski |
| 5,841,763 A | 11/1998 | Leondires et al. |
| 5,859,979 A | 1/1999 | Tung et al. |
| 5,870,146 A | 2/1999 | Zhu |
| 5,896,128 A | 4/1999 | Boyer |
| 5,900,907 A | 5/1999 | Malloy et al. |
| 5,914,940 A | 6/1999 | Fukuoka et al. |
| 5,990,931 A | 11/1999 | Nimri et al. |
| 5,991,277 A | 11/1999 | Maeng et al. |
| 5,995,608 A | 11/1999 | Detampel, Jr. et al. |
| 6,025,870 A | 2/2000 | Hardy |
| 6,038,532 A | 3/2000 | Kane et al. |
| 6,043,844 A | 3/2000 | Bist et al. |
| 6,049,694 A | 4/2000 | Kassatly |
| 6,078,350 A | 6/2000 | Davis |
| 6,101,480 A | 8/2000 | Conmy et al. |
| 6,122,668 A | 9/2000 | Teng et al. |
| 6,128,649 A | 10/2000 | Smith et al. |
| 6,151,619 A | 11/2000 | Riddle |
| 6,160,573 A | 12/2000 | Allen et al. |
| 6,195,184 B1 | 2/2001 | Chao et al. |
| 6,243,129 B1 | 6/2001 | Deierling |
| 6,281,882 B1 | 8/2001 | Gordon et al. |
| 6,285,661 B1 | 9/2001 | Zhu et al. |
| 6,286,034 B1 | 9/2001 | Sato et al. |
| 6,288,740 B1 | 9/2001 | Lai et al. |
| 6,292,204 B1 | 9/2001 | Carleton et al. |
| 6,300,973 B1 | 10/2001 | Feder et al. |
| 6,314,211 B1 | 11/2001 | Kim et al. |
| 6,343,314 B1 | 1/2002 | Ludwig |
| 6,373,517 B1 | 4/2002 | Davis et al. |
| 6,400,996 B1 | 6/2002 | Hoffberg et al. |
| 6,453,285 B1 | 9/2002 | Anderson et al. |
| 6,480,823 B1 | 11/2002 | Zhao et al. |
| 6,496,216 B2 | 12/2002 | Feder et al. |
| 6,526,099 B1 | 2/2003 | Christopoulos et al. |
| 6,535,604 B1 | 3/2003 | Provencal et al. |
| 6,564,380 B1 | 5/2003 | Murphy |
| 6,590,604 B1 | 7/2003 | Tucker et al. |
| 6,594,688 B2 | 7/2003 | Ludwig et al. |
| 6,603,501 B1 | 8/2003 | Parry et al. |
| 6,646,997 B1 | 11/2003 | Baxley et al. |
| 6,654,045 B2 | 11/2003 | Allen et al. |
| 6,657,975 B1 | 12/2003 | Baxley et al. |
| 6,677,979 B1 | 1/2004 | Westfield |
| 6,711,212 B1 | 3/2004 | Lin |
| 6,728,221 B1 | 4/2004 | Shaffer et al. |
| 6,744,460 B1 | 6/2004 | Nimri et al. |
| 6,757,005 B1 | 6/2004 | Elbaz et al. |
| 6,760,415 B2 | 7/2004 | Beecroft |
| 6,774,928 B2 | 8/2004 | Bruzzone |
| 6,813,083 B2 | 11/2004 | Kobayashi |
| 6,816,904 B1 | 11/2004 | Ludwig et al. |
| 6,847,403 B1 | 1/2005 | Forsberg, Jr. et al. |
| 6,909,552 B2 | 6/2005 | Dohi et al. |
| 6,944,259 B2 | 9/2005 | Yang |
| 6,967,321 B2 | 11/2005 | Leong et al. |
| 7,061,521 B2 * | 6/2006 | Bulriss et al. ............... 348/14.08 |
| 7,089,285 B1 | 8/2006 | Drell |
| 7,133,062 B2 | 11/2006 | Castles et al. |
| 7,312,809 B2 | 12/2007 | Bain et al. |
| 7,321,384 B1 | 1/2008 | Wu et al. |
| 7,330,541 B1 | 2/2008 | Surazski et al. |
| 7,339,605 B2 | 3/2008 | Rodman et al. |
| 7,353,251 B1 | 4/2008 | Balakrishnan |
| 7,477,282 B2 | 1/2009 | Firestone et al. |
| 7,487,210 B2 | 2/2009 | Ludwig et al. |
| 7,653,013 B1 * | 1/2010 | Moran ............... 370/261 |
| 8,233,605 B2 * | 7/2012 | Whitfield et al. ......... 379/202.01 |
| 2002/0133247 A1 | 9/2002 | Smith et al. |
| 2002/0188731 A1 | 12/2002 | Potekhin et al. |
| 2003/0038807 A1 | 2/2003 | Demos |
| 2003/0174146 A1 | 9/2003 | Kenoyer |
| 2003/0232648 A1 | 12/2003 | Prindle |
| 2004/0113939 A1 | 6/2004 | Zacks et al. |
| 2004/0183897 A1 | 9/2004 | Kenoyer et al. |
| 2004/0263610 A1 | 12/2004 | Whynot et al. |
| 2005/0012812 A1 | 1/2005 | Seo |
| 2005/0024485 A1 | 2/2005 | Castles et al. |
| 2005/0198134 A1 | 9/2005 | Kenoyer et al. |
| 2005/0259144 A1 | 11/2005 | Eshkoli |
| 2006/0013416 A1 | 1/2006 | Truong et al. |
| 2006/0164508 A1 * | 7/2006 | Eshkoli et al. ............. 348/14.09 |
| 2006/0184497 A1 | 8/2006 | Suzuki et al. |
| 2006/0244817 A1 | 11/2006 | Harville et al. |
| 2006/0245379 A1 * | 11/2006 | Abuan et al. ............... 370/261 |
| 2006/0277254 A1 | 12/2006 | Kenoyer et al. |
| 2007/0009113 A1 | 1/2007 | Kenoyer |
| 2007/0009114 A1 | 1/2007 | Kenoyer et al. |
| 2007/0116225 A1 * | 5/2007 | Zhao et al. ............... 379/202.01 |
| 2009/0296608 A1 * | 12/2009 | Khan et al. ............... 370/260 |

OTHER PUBLICATIONS

"MediaMax Operations Manual"; May 1992; 142 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; <http://www.video.ja.net/intro/>; 2001; 26 pages.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; <http://www.medlib.iupui.edu/techsupport/vc/vcinstructions.html>; 2002; 3 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

(56) References Cited

OTHER PUBLICATIONS

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; At&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

"Eye-to-Eye Video"; Retrieved from the Internet: <http://itotd.com/articles/254/eye-to-eye-video/>; Jul. 23, 2004; 6 pages.

"Free2C 3D-Display" (web archive: <http://www.hhi.fraunhofer.de/english/im/products/Cebit/free2C/free2C.html> dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpeech Press.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of The International Society for Optical Engineering; May 1997; p. 12.

Jefferson Han and Brian Smith; "CU-SeeMe VR Immersive Desktop Teleconferencing"; Proceeding of the Fourth ACM international conference on Multimedia; 1997; pp. 199-207.

David McAllister; "Display Technology: Stereo & 3D Display Technologies" North Carolina State University, http://web.archive.org/web/20031206213341/http://research.csc.ncsu.edu/stereographics/wiley.pdf (date or web archive Dec. 6, 2003); 50 pages.

Alexander Sawchuk, Isaac Cohen, Chris Kyriakakis, and Albert Rizzo; "Three Dimensional Interaction with Autostereoscopic Displays" (date unknown); 8 pages.

Lars Weinand; "3D Stereo Technology: Is it Ready for Prime Time?"; http://www.tomshardware.com/2005/05/02/3d_stereo_technology; May 2, 2005; 40 pages.

"Technical Handbook"; North Dakota Interactive Video Network; Jan. 2003; 38 pages.

Gong, Fengmin; "Multipoint Audio and Video Control for Packet-Based Multimedia Conferencing"; Proceedings of the 2nd Association for Computing Machinery International Conference on Multimedia; San Francisco, CA; 1994; pp. 425-432.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Aurel A. Lazar and Koon-Seng Lim; "Programmability and Service Creation for Multimedia Networks"; Fifth IEEE International Symposium on High Performance Distributed Computing; 1996; pp. 217-223.

U.S. Appl. No. 12/142,263, entitled "Virtual Decoders", by Keith C. King and Wayne E. Mock, filed on Jun. 19, 2008.

U.S. Appl. No. 12/142,302, entitled "Video Conferencing System Which Allows Endpoints to Perform Continuous Presence Layout Selection", by Keith C. King and Wayne E. Mock, filed on Jun. 19, 2008.

U.S. Appl. No. 12/142,340, entitled "Video Conferencing Device Which Performs Multi-way Conferencing", by Keith C. King and Wayne E. Mock, filed on Jun. 19, 2008.

U.S. Appl. No. 12/142,377, entitled "Video Decoder Which Processes Multiple Video Streams", by Keith C. King and Wayne E. Mock, filed on Jun. 19, 2008.

U.S. Appl. No. 12/171,358, entitled "Virtual Multiway Scaler Compensation", by Keith C. King and Wayne E. Mock, filed on Jul. 11, 2008.

U.S. Appl. No. 11/858,342, entitled "Videoconferencing System Discovery", by Matthew K. Brandt, filed on Sep. 20, 2007.

U.S. Appl. No. 61/157,511, entitled "Virtual Distributed Multipoint Control Unit", by Keith C. King, Ashish Goyal, and Hrishikesh Gopal Kulkarni, filed on Mar. 4, 2009.

U.S. Appl. No. 61/157,516, entitled "Videoconferencing Endpoint Extension", by Keith C. King, Matthew K. Brandt, and Wayne E. Mock, filed on Mar. 4, 2009.

U.S. Appl. No. 12/244,436, entitled "Systems and Methods for Selecting Videoconferencing Endpoints for Display in a Composite Video Image", by Ashish Goyal, Hrishikesh Gopal Kulkarni, and Shantha Kumari Harohalli Sathyanarayana Rao, filed on Oct. 2, 2008.

(56) References Cited

OTHER PUBLICATIONS

U.S. Appl. No. 11/252,238, entitled "Video Conferencing System Transcoder", by Michael L. Kenoyer and Michael V. Jenkins, filed on Oct. 17, 2005.

U.S. Appl. No. 11/693,074, entitled "Distributed Videoconferencing Processing", by Randall D. Groves, Michael L. Kenoyer, and Craig B. Malloy, filed on Mar. 29, 2007.

U.S. Appl. No. 11/405,372, entitled "Live Video Icons for Signal Selection in a Videoconferencing System", by Wayne E. Mock and Michael L. Kenoyer, filed on Apr. 17, 2006.

U.S. Appl. No. 11/348,217, entitled "Controlling Video Display Mode in a Video Conferencing System", by Michael L. Kenoyer, filed on Feb. 6, 2006.

* cited by examiner

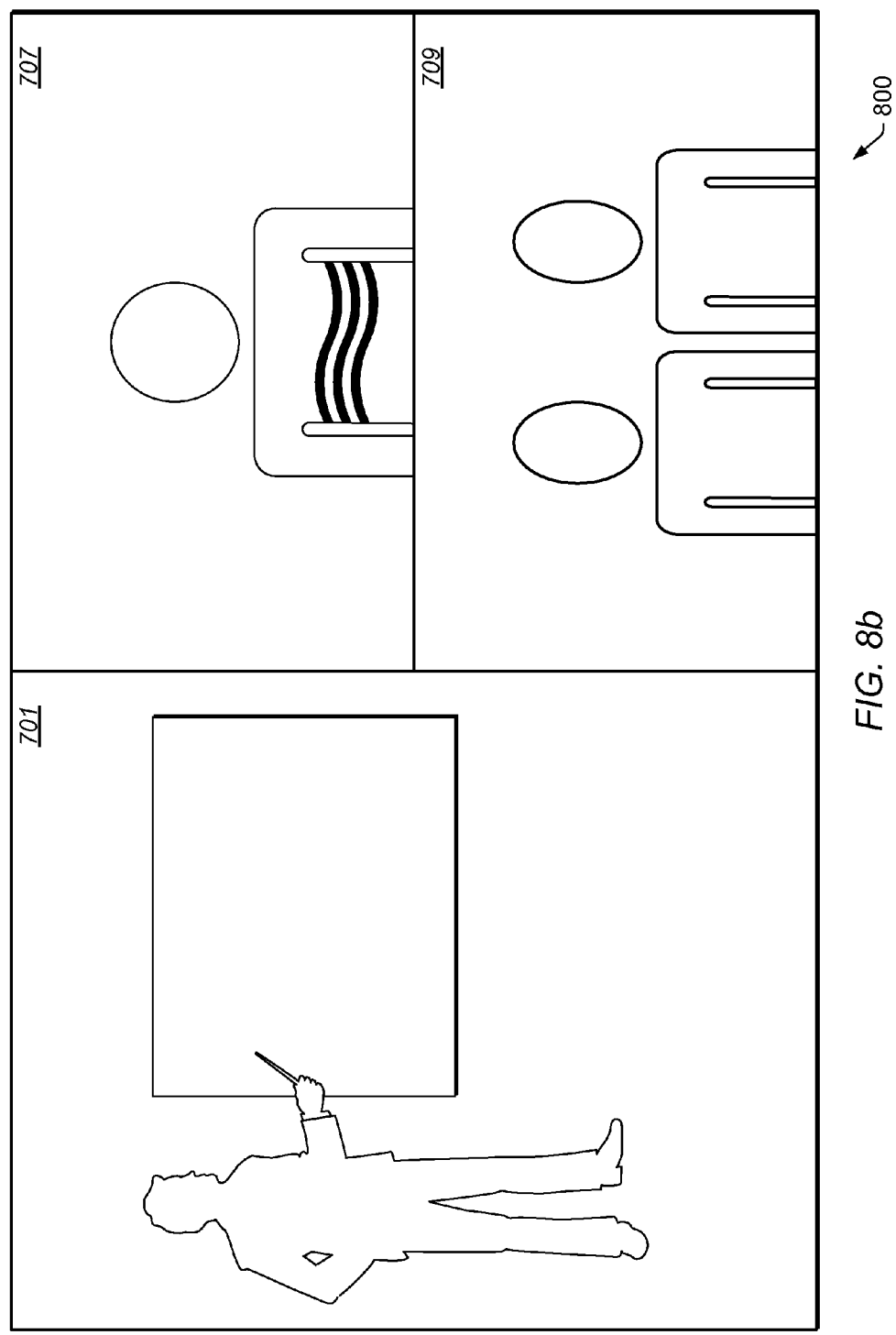

VIDEOCONFERENCING ENDPOINT EXTENSION

PRIORITY DATA

This application claims benefit of priority of U.S. provisional application Ser. No. 61/157,516 titled "Videoconferencing Endpoint Extension" filed Mar. 4, 2009, whose inventors were Keith C. king, Matthew K. Brandt, and Wayne E. Mock, which is hereby incorporated by reference in its entirety as though fully and completely set forth herein.

BACKGROUND

1. Field of the Invention

The present invention relates generally to conferencing and, more specifically, to videoconferencing.

2. Description of the Related Art

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document or presentation for both participants during the conference).

SUMMARY

In various embodiments, a primary endpoint may determine whether to have one or more endpoints in a videoconference managed by a secondary endpoint. The primary endpoint may make the determination before the videoconference (e.g., upon receiving a request to initiate a videoconference) or during the videoconference. In some embodiments, the primary endpoint may manage a group of secondary endpoints such that, if needed, the primary endpoint can use one or more of the secondary endpoints to manage the videoconference and/or assist the primary endpoint in managing the videoconference by supporting one or more endpoints involved in the videoconference.

In some embodiments, the primary endpoint may determine whether to switch conference communications of one or more of the endpoints in the videoconference from the primary endpoint to a secondary endpoint in the videoconference. For example, the primary endpoint may switch conference communications if the primary endpoint needs additional inputs to manage the videoconference. For example, switching may occur if the number of video inputs (e.g., from remote endpoints, local cameras, etc.) in a videoconference are about to exceed or are predicted to exceed the processing capabilities (e.g., the number of decoder ports) of the primary endpoint. In this case, the primary endpoint may make the switching determination to transfer one or more of the video input sources (e.g., remote endpoints) to the secondary endpoint with capacity to manage (or assist in managing) the videoconference. The primary endpoint may thus make the switching determination based in part on a number of endpoints in the videoconference (e.g., if the number of endpoints exceeds a number of input ports of the primary endpoint, the primary endpoint may switch one or more of the endpoints to a secondary endpoint). Switching may also occur where the primary endpoint is transferring the entire videoconference to one or more secondary endpoints.

In some embodiments, the primary endpoint may communicate the switching instructions to the secondary endpoint and/or the endpoints in the videoconference to be switched. In some embodiments, the primary endpoint may transfer one or more of the video input sources in the videoconference to a secondary endpoint that the primary endpoint controls (or may pass control of the entire videoconference over to the secondary endpoint). In some embodiments, the primary endpoint may seamlessly pass one or more of the endpoints to the secondary endpoint such that participants in the videoconference may not be aware that a switch has been performed. In some embodiments, the primary endpoint may contact the secondary endpoint and may then pass endpoints to the secondary endpoint by having the endpoints to be passed send their video (and/or audio) to a different address (e.g., the IP (Internet Protocol) address of the secondary endpoint). The primary endpoint may also pass configuration information for the endpoints to the secondary endpoint. In some embodiments, the primary endpoint may make the switching determination based at least in part on an external indication (e.g., a participant in the videoconference may direct the primary endpoint to perform the switch and/or may specify a secondary endpoint to switch the communications to).

In some embodiments, the primary endpoint may manage multiple secondary endpoints to conduct one or more videoconferences. In some embodiments, the primary endpoint may use one secondary endpoint per videoconference. As another example, the primary endpoint may organize videoconferences on several secondary endpoints in a stacked method such that all of the input ports of one secondary endpoint are used before another secondary endpoint is used. Using a stacked method, a single videoconference may actually be supported on multiple secondary endpoints. In some embodiments, the primary endpoint and/or secondary endpoint may use an n-talker processing method to support more videoconferencing endpoints in one or more of the videoconferences than the total number of input ports of the videoconferences.

BRIEF DESCRIPTION OF THE DRAWINGS

FIG. 8b illustrates a new video layout, according to an embodiment.

Figure 1:
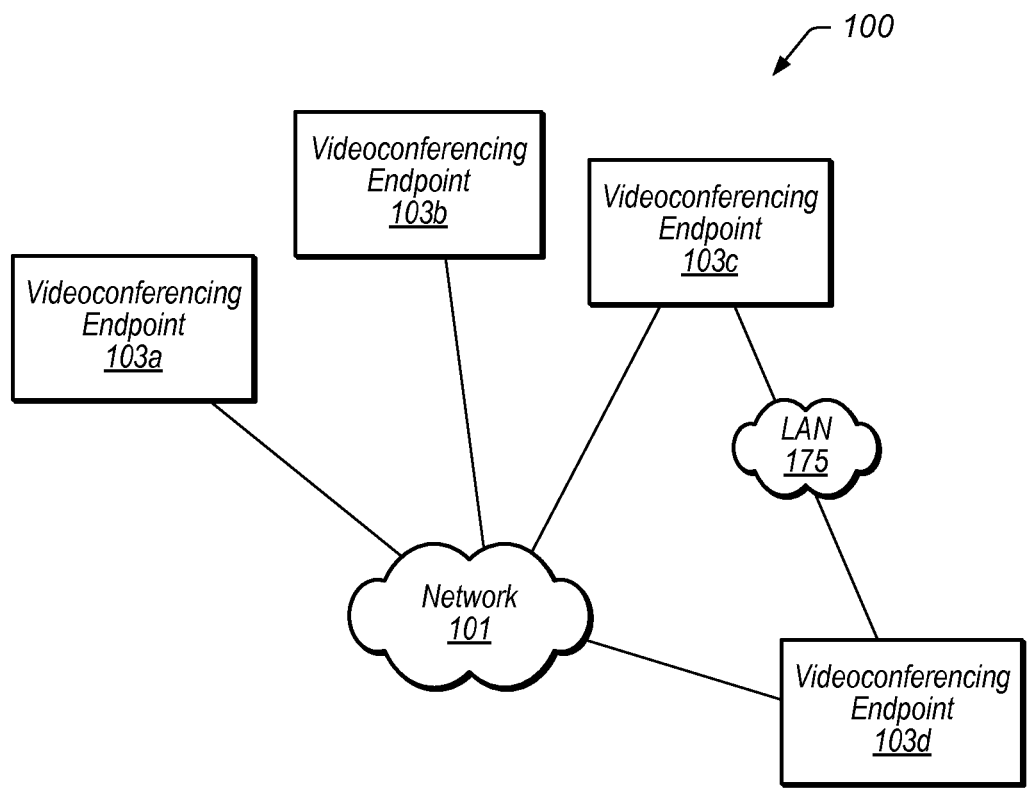
FIG. 1 illustrates a videoconferencing endpoint network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. Patent Application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. Patent Application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. Patent Application titled "Video Conferencing System which Allows Endpoints to Perform Continuous Presence Layout Selection", Ser. No. 12/142,302, which was filed Jun. 19, 2008, whose inventors are Keith C. King and Wayne E. Mock, is hereby incorporated by reference in its entirety as though fully and completely set forth herein.

U.S. Patent Application titled "Video Conferencing Device which Performs Multi-way Conferencing", Ser. No. 12/142,340, which was filed Jun. 19, 2008, whose inventors are Keith C. King and Wayne E. Mock, is hereby incorporated by reference in its entirety as though fully and completely set forth herein.

U.S. Patent Application titled "Video Decoder which Processes Multiple Video Streams", Ser. No. 12/142,377, which was filed Jun. 19, 2008, whose inventors are Keith C. King and Wayne E. Mock, is hereby incorporated by reference in its entirety as though fully and completely set forth herein.

U.S. Patent Application titled "Virtual Multiway Scaler Compensation", Ser. No. 12/171,358, which was filed Jul. 11, 2008, whose inventors are Keith C. King and Wayne E. Mock, is hereby incorporated by reference in its entirety as though fully and completely set forth herein.

U.S. Patent Application titled "Integrated Videoconferencing System", Ser. No. 11/405,686, which was filed Apr. 17, 2006, whose inventors are Michael L. Kenoyer, Patrick D. Vanderwilt, Craig B. Malloy, William V. Oxford, Wayne E. Mock, Jonathan I. Kaplan, and Jesse A. Fourt is hereby incorporated by reference in its entirety as though fully and completely set forth herein.

U.S. Provisional Patent Application titled "Virtual Distributed Multipoint Control Unit", Ser. No. 61/157,511, which was filed on Mar. 4, 2009, whose inventors are Keith C. King, Ashish Goyal, and Hrishikesh Gopal Kulkarni is hereby incorporated by reference in its entirety as though fully and completely set forth herein.

FIG. 1 illustrates an embodiment of videoconferencing system network 100. FIG. 1 illustrates an exemplary embodiment of videoconferencing system network 100 which may include network 101 and endpoints 103a-103d (e.g., videoconferencing systems) (other numbers of endpoints are also contemplated). Although not shown in FIG. 1, videoconferencing system network 100 may also include other devices, such as gateways, a service provider, conference units, and plain old telephone system (POTS) telephones, among others. Endpoints 103a-103d (referred to generally herein as "endpoints 103") may be coupled to network 101 (e.g., via gateways (not shown)). Gateways may each include firewall, network address translation (NAT), packet filter, and/or proxy mechanisms, among others.

Endpoints 103 may include videoconferencing system endpoints (also referred to as "participant locations"). Each endpoint 103 may include a camera, display device, microphone, speakers, and a codec or other type of videoconferencing hardware. In some embodiments, endpoints 103 may include video and voice communications capabilities (e.g., videoconferencing capabilities), include or be coupled to various audio devices (e.g., microphones, audio input devices, speakers, audio output devices, telephones, speaker telephones, etc), and include or be coupled to various video devices (e.g., monitors, projectors, displays, televisions, video output devices, video input devices, cameras, etc). In some embodiments, endpoints 103 may include various ports for coupling to one or more devices (e.g., audio devices, video devices, etc.) and/or to one or more networks. Endpoints 103 may each include and/or implement one or more real time protocols, e.g., session initiation protocol (SIP), H.261, H.263, H.264, H.323, among others. In an embodiment, endpoints 103 may implement H.264 encoding for high definition (HD) video streams. In some embodiments, a Multipoint Control Unit (MCU) may function to receive video from two or more sources (e.g., endpoints 103) and provide video (e.g., with composite video images 407) to two or more recipients (e.g., endpoints 103). "MCU" as used herein is intended to have the full breath of its ordinary meaning. In some embodiments, one or more endpoints 103 may include embedded MCU functionality.

Network 101 may include a wide area network (WAN) such as the Internet. Network 101 may include a plurality of networks coupled together, e.g., one or more local area networks (LANs) 175 coupled to the Internet. Network 101 may also include public switched telephone network (PSTN). Network 101 may also include an Integrated Services Digital Network (ISDN) that may include or implement H.320 capabilities. In various embodiments, video and audio conferencing may be implemented over various types of networked devices.

In some embodiments, endpoints 103a-103d may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103a-103d) that communicate through network 101.

In some embodiments, videoconferencing system network 100 (e.g., endpoints 103a-d) may be designed to operate with network infrastructures that support T1 capabilities or less, e.g., 1.5 mega-bits per second or less in one embodiment, and 2 mega-bits per second in other embodiments (other capacities (e.g., 6 mega-bits per second, greater than 10 mega-bits per second) are also contemplated). The videoconferencing system may support HD capabilities. The term "high resolution" includes displays with resolution of 1280×720 pixels and higher. In one embodiment, high-definition resolution may include 1280×720 progressive scans at 60 frames per second, or 1920×1080 interlaced or 1920×1080 progressive. Thus, an embodiment of the present invention may include a videoconferencing system with HD "e.g. similar to HDTV" display capabilities using network infrastructures with bandwidths T1 capability or less. The term "high-definition" is intended to have the full breath of its ordinary meaning and includes "high resolution".

FIG. 1 illustrates a configuration for a videoconferencing network. The videoconferencing networks may be operable to perform discovery, e.g., as described in more detail below, e.g., using one or more videoconferencing application(s) stored by videoconferencing systems in the network. As shown in FIG. 1, endpoints 103A-D may be connected via network 101 (e.g., a wide area network such as the Internet) and endpoints 103C and 103D may be coupled over local area network (LAN) 175. The networks may be any type of network (e.g., wired or wireless) as desired. These videoconferencing systems may discover each other. For example, endpoint 103a may be operable to automatically discover one or more of endpoints 103e-m according to the methods described in U.S. Patent Application titled "Videoconferencing System Discovery", Ser. No. 11/858,342, which was filed Sep. 20, 2007, whose inventor is Matthew K. Brandt and which is hereby incorporated by reference in its entirety as though fully and completely set forth herein.

Figure 2:
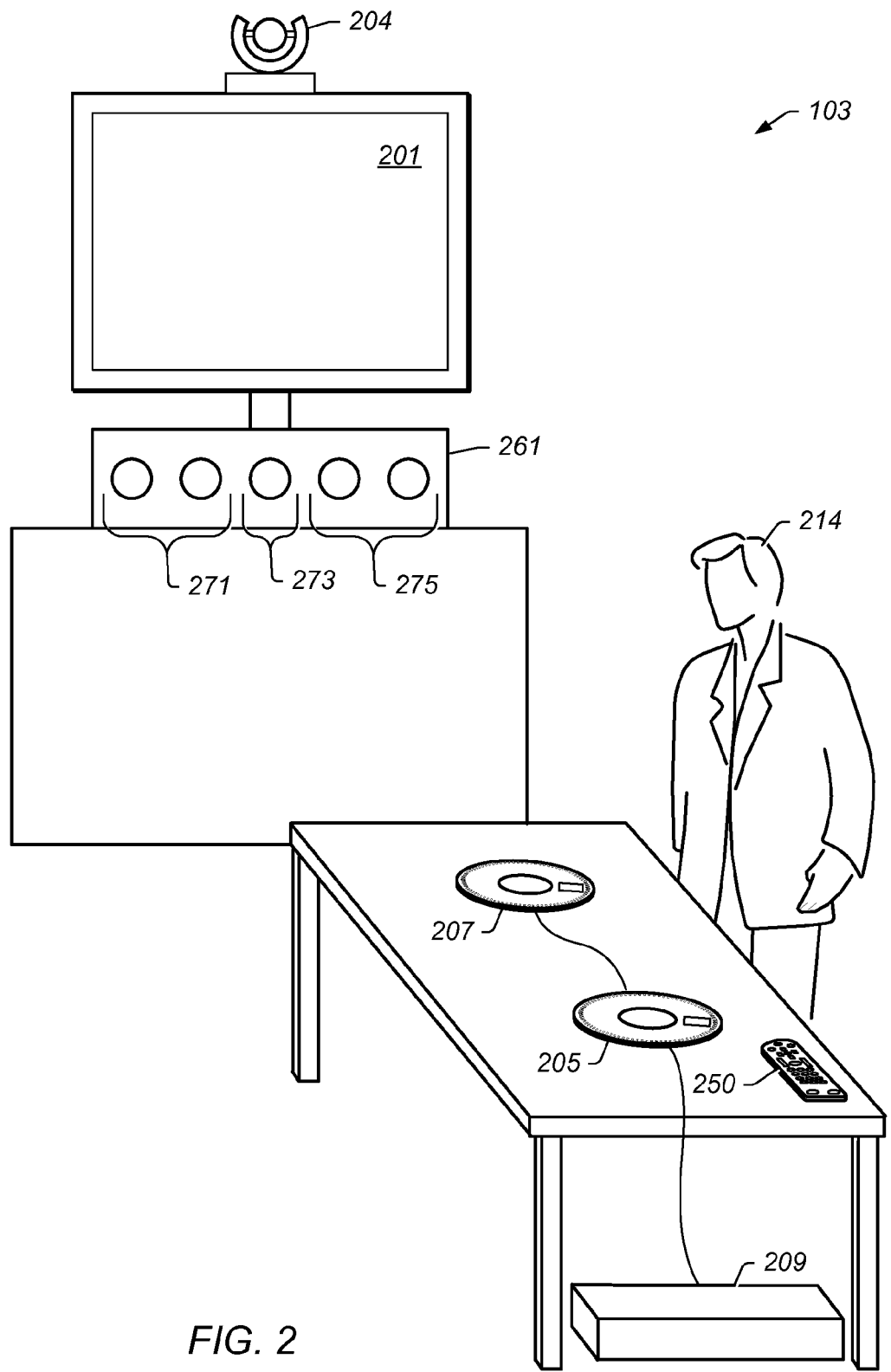
FIG. 2 illustrates a videoconferencing endpoint, according to an embodiment.

FIG. 2 illustrates an exemplary embodiment of videoconferencing system endpoint 103 (e.g., 103a), also referred to as a videoconferencing system, videoconferencing unit, or participant location. Endpoint 103 may have system codec box 209 to manage both speakerphones 205/207 and the videoconferencing hardware (e.g., camera 204, speakers 271, 273, 275, etc). Speakerphones 205/207 and other videoconferencing system components may be coupled to codec box 209 and may receive audio and/or video data from system codec box 209.

In some embodiments, endpoint 103 may include camera 204 (e.g., an HD camera) for acquiring video images of the participant location (e.g., of participant 214). Other cameras are also contemplated. Endpoint 103 may also include display 201 (e.g., an HDTV display). Images acquired by camera 204 may be displayed locally on display 201 and may also be encoded and transmitted to other endpoints 103 in the videoconference.

Endpoint 103 may also include sound system 261. Sound system 261 may include multiple speakers including left speakers 271, center speaker 273, and right speakers 275. Other numbers of speakers and other speaker configurations may also be used. Endpoint 103 may also use one or more speakerphones 205/207 which may be daisy chained together.

In some embodiments, the videoconferencing endpoint components (e.g., camera 204, display 201, sound system 261, and speakerphones 205/207) may be coupled to system codec ("compressor/decompressor") box 209. System codec box 209 may be placed on a desk or on a floor. Other placements are also contemplated. System codec box 209 may receive audio and/or video data from a network (e.g., network 101). System codec box 209 may send the audio to speakerphones 205/207 and/or sound system 261 and the video to display 201. The received video may be HD video that is displayed on the HD display. System codec box 209 may also receive video data from camera 204 and audio data from speakerphones 205/207 and transmit the video and/or audio data over network 101 to another videoconferencing system endpoint 103. Videoconferencing system endpoint 103 may be controlled by a participant through the user input components (e.g., buttons) on speakerphones 205/207 and/or remote control 250. Other system interfaces may also be used.

In various embodiments, system codec box 209 may implement a real time transmission protocol. In some embodiments, system codec box 209 may include any system and/or method for encoding and/or decoding (e.g., compressing and decompressing) data (e.g., audio and/or video data). In some embodiments, system codec box 209 may not include one or more of the compressing/decompressing functions. In some embodiments, communication applications may use system codec box 209 to convert an analog signal to a digital signal for transmitting over various digital networks (e.g., network 101, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, endpoint 103 may capture a local image of the local participants and provide a video stream (e.g., to another endpoint 103). In some embodiments, endpoint 103 may create composite video image 407 (e.g., see FIGS. 4a-d) of two or more of the received video streams and provide composite video image 407 to each of endpoints 103. Composite video image 407 may have a certain layout 405. According to one embodiment, endpoint 103 may also generate coordinate information (or metadata) that describes the locations of the various images in composite video image 407. Endpoint 103 may use the coordinate information to separate out the plurality of images from composite video image 407, and then generate new composite video image 407 having a new layout, e.g., as specified by the user. Endpoint 103 may also use a virtual decoder technique in separating out the received composite video image 407 (e.g., as described in the patent application entitled "Virtual Decoders" which was incorporated by reference above). In some embodiments, endpoint 103 may request or may composite layouts for multiple displays at the endpoint conference site (e.g., one layout for one display and a different layout for a second display).

Videoconferencing system 103 may execute various videoconferencing application software that presents a graphical user interface (GUI) on display 201. The GUI may be used to present an address book, contact list, list of previous callees (call list) and/or other information indicating other videoconferencing system endpoints 103 that the user may desire to call to conduct a videoconference.

Figure 3A:
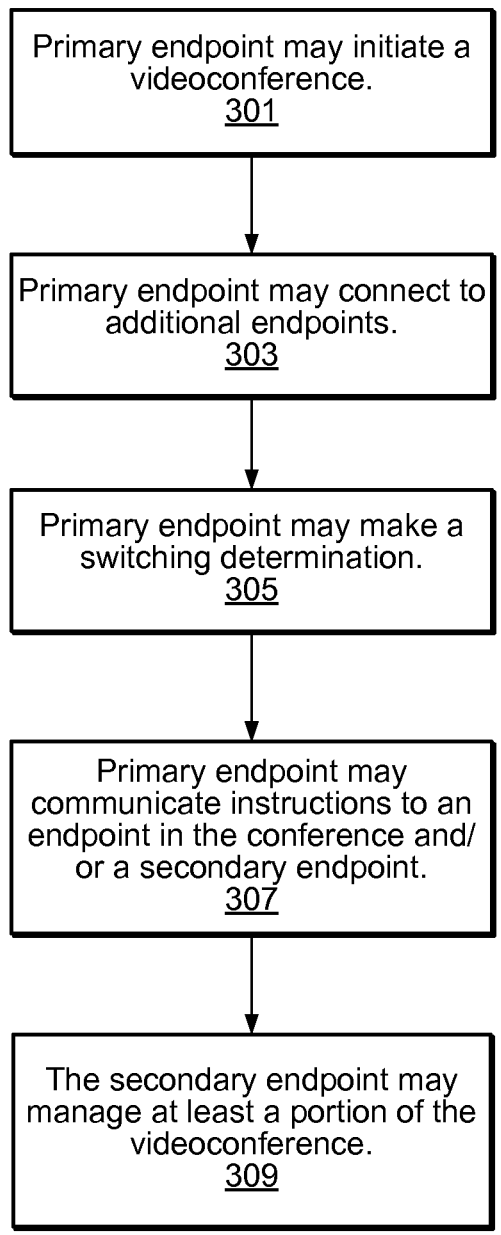
FIG. 3a illustrates a flowchart of a method for extending endpoint resources, according to an embodiment.

FIG. 3a illustrates a flowchart of a method for extending endpoint resources, according to an embodiment. It should be noted that in various embodiments of the methods described below, one or more of the elements described may be performed concurrently, in a different order than shown, or may be omitted entirely. Other additional elements may also be performed as desired.

At 301, primary endpoint 151 may initiate a videoconference. For example, primary endpoint 151 may receive a request from local participant 214 to dial remote endpoint 103 (e.g., remote endpoint 103e in FIG. 3b) to establish a videoconference or primary endpoint 151 may receive a request from remote endpoint 103 to establish a videoconference. In some embodiments, requesting participant 214 may enter a prefix or conference type identifier (e.g., by pressing a videoconference button or entering "01" to indicate a videoconference, "02" to indicate an audio conference, etc). In some embodiments, participant 214 may dial a conference number (e.g., 123321) to access a scheduled videoconference or an ongoing videoconference. In some embodiments, endpoint 103 may dial primary endpoint 151 directly, endpoint 103 may initiate communications with a bridge via Intelligent Voice Routing (IVR), or prefix dialing through a gatekeeper. Other conference initiations are also contemplated. As noted above, in some embodiments, primary endpoint 151 may include a local conference endpoint capable of supporting a videoconference that includes one or more local participants. For example, primary endpoint 151 may be capable of receiving 3 input signals and providing two output signals. Other combinations of input signal and output signal capabilities are also contemplated. It is to be noted that "primary endpoint" and "secondary endpoint" may be embodiments of endpoint 103 described above. For example, a primary endpoint 151 and/or secondary endpoint 153 may operate as a participating endpoint in a videoconference. Further, primary endpoint 151 and/or secondary endpoint 153 may be capable of operating as a master endpoint or facilitator endpoint as described in patent application entitled "Virtual Distributed Multipoint Control Unit System" incorporated by reference above.

Figure 3B:
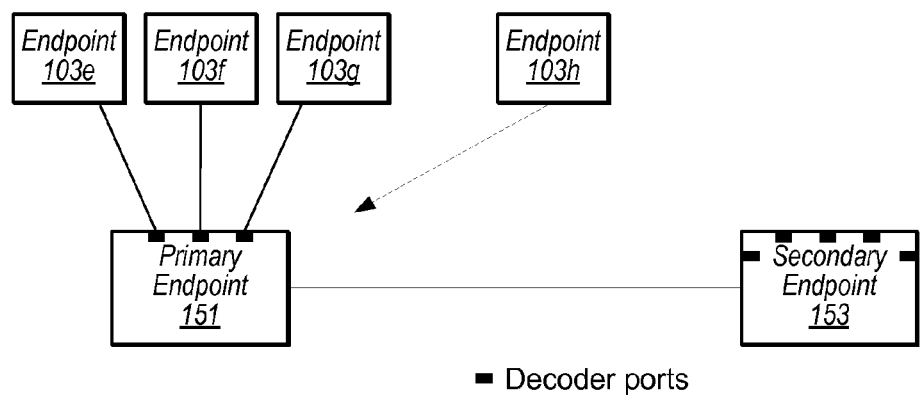
FIGS. 3b-d illustrate switching endpoint communications to a secondary endpoint, according to an embodiment.

At 303, primary endpoint 151 may connect to additional endpoints 103. For example, primary endpoint 151 may receive connection requests from additional endpoints 103 and primary endpoint 151 may add additional endpoints 103 (e.g., endpoints 103f and 103g as seen in FIG. 3b) to the videoconference. Alternatively, primary endpoint 151 may dial other endpoints 103 (e.g., at the request of a local participant) to join the other endpoints 103 into the videoconference. In some embodiments, a participant at primary endpoint 151 may press an "add-call" button (or, for example, access an add-call menu option, etc.) to add an endpoint.

Figure 3C:
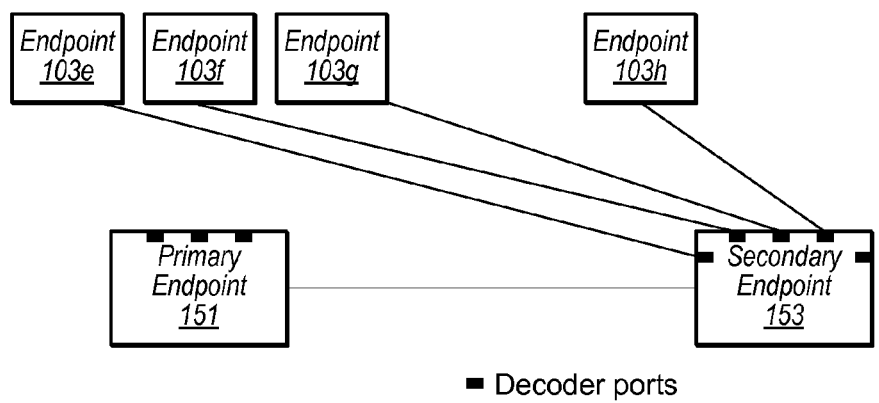
Figure 3D:
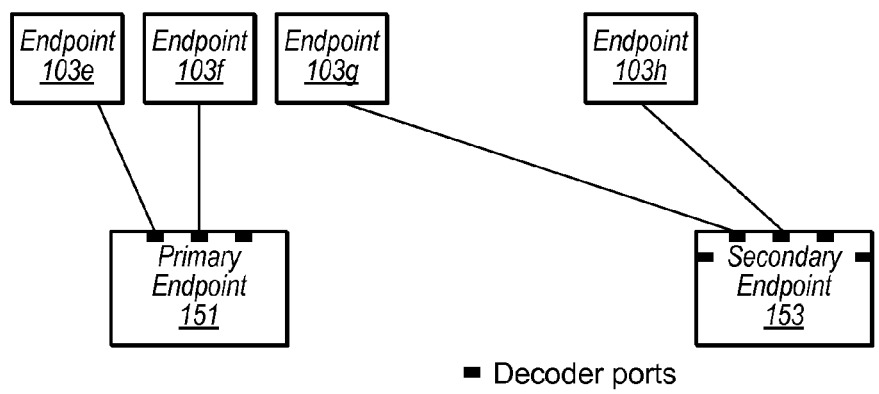

At 305, primary endpoint 151 may make a switching determination. In some embodiments, if the number of video inputs (e.g., from remote endpoints, local cameras, etc.) in a videoconference are about to exceed or are predicted to exceed the processing capabilities (e.g., the number of decoder ports) of primary endpoint 151 (e.g., when endpoint 103h in FIG. 3b tries to connect to the videoconference), primary endpoint 151 may make the switching determination to transfer one or more of the video input sources (e.g., remote endpoints 103) to secondary endpoint 153 with capacity to manage the videoconference (or assist in managing the videoconference). For example, endpoints 103 may be transferred to secondary endpoint 153 (e.g., as seen in FIG. 3c, endpoints 103e-h may be transferred to secondary endpoint 153) or a subset of endpoints 103 may be transferred (e.g., as seen in FIG. 3d, endpoints 103g-h may be transferred to secondary endpoint 153). In some embodiments, transferring endpoint 103 may include sending instructions to endpoint 103 and/or to secondary endpoint 153 to establish communications with each other. Endpoint 103 may then begin communicating with secondary endpoint 153 (and/or vice-versa). In some embodiments, transferring an endpoint 103 may include directing endpoint 103, attempting to connect to primary endpoint 151, to secondary endpoint 153. For example, if primary endpoint 151 has three video decoders, when a fourth endpoint attempts to connect, the fourth endpoint may be directed to secondary endpoint 153 and primary endpoint 151 and secondary endpoint 153 may coordinate to facilitate the videoconference call with all four endpoints 103.

In some embodiments, primary endpoint 151 may make a switching determination to transfer one or more of the video input sources in a videoconference to secondary endpoint 153 before the number of video inputs exceeds the number of decoders on primary endpoint 151. For example, if a planned videoconference will require more resources than primary endpoint 151 is configured to provide, primary endpoint 151 may transfer the videoconference (or part of the videoconference) to secondary endpoint 153 before the resources on primary endpoint 151 are exceeded. In some embodiments, primary endpoint 151 may use secondary endpoint 153 from the beginning of a videoconference. For example, primary endpoint 151 may have an IP address (or a prioritized list of IP addresses) of one or more secondary endpoints 153 to connect to when establishing a videoconference. Primary endpoint 151 may also analyze which secondary endpoint 153 to use for the videoconference by analyzing the characteristics of secondary endpoints 153 (e.g., number of input ports, codec types supported, etc). In some embodiments, primary endpoint 151 may transfer the videoconference to one of endpoints 103 in the videoconference (e.g., if primary endpoint 151 determines that one of endpoints 103 in the videoconference has the ability to manage the videoconference).

In some embodiments, primary endpoint 151 may make the switching determination at least in part on an external indication (e.g., a participant in the videoconference may direct primary endpoint 151 to perform the switch and/or may specify which secondary endpoint 153 to switch the communications to). In some embodiments, primary endpoint 151 may use secondary endpoints 153 on a first-come-first-serve basis or may use a specified order (e.g., specified by a participant 214). In some embodiments, videoconferences may be assigned to secondary endpoints 153 based on characteristics of the secondary endpoint (e.g., number of decoders, availability, etc). In some embodiments, as new endpoints 103 call into primary endpoint 151, new endpoints 103 may be redirected to secondary endpoint 153 without the user of the new endpoint knowing that the endpoint has been redirected.

At 307, primary endpoint 151 may communicate instructions to endpoint 103 and/or secondary endpoint 153. Primary endpoint 151 may make a switching determination based in part on a number of endpoints 103 to support in the videoconference exceeding a number of input ports of primary endpoint 151. In some embodiments, primary endpoint 151 may access another endpoint resource to support the videoconference. In some embodiments, primary endpoint 151 may transfer all of the video input sources (such as the participating endpoints 103) in the videoconference to a larger secondary endpoint 153 that primary endpoint 151 may control or may pass control of the videoconference over to. In some embodiments, primary endpoint 151 may transfer a subset of the video inputs to secondary endpoint 153 (and may maintain control over the non-transferred video inputs). If primary endpoint 151 and one or more secondary endpoints 153 are supporting a videoconference together, the primary endpoint 151 and/or secondary endpoints 153 may communicate (e.g., over a local connection, over the network 101, etc.) to support the videoconference. For example, video images of the endpoints to be put into a composite video image for the videoconference may be sent from the primary endpoint 151 to the secondary endpoint 153 (or sent from the secondary endpoint 153 to the primary endpoint 151) to be composited with other video images. Similarly, audio streams, configuration information, etc. may be shared (e.g., over local daisy-chained connections, network connections, etc.) as needed among the primary endpoint 151/secondary endpoints 153 to support the videoconference.

In some embodiments, primary endpoint 151 may use multiple secondary endpoints 153 to conduct a videoconference (e.g., as seen in FIGS. 1*b-c*). For example, primary endpoint 151 may organize videoconferences on several secondary endpoints 153 in a stacked method such that all of input ports of one secondary endpoint 153 are used before another secondary endpoint 153 is used to manage a videoconference. Using a stacked method, a single videoconference may be supported on multiple secondary endpoints 153 (e.g., two 10 input port secondary endpoints 153 may support a 20 way call or three 6 way calls, etc). In some embodiments, each videoconference may use an n-talker processing method as described in U.S. Patent Application titled "Systems and Methods for Selecting Videoconferencing Endpoints for Display in a Composite Video Image", Ser. No. 12/244,436, which was filed Oct. 2, 2008, whose inventors are Ashish Goyal, Hrishikesh Gopal Kulkarni, and Shantha Kumari Harohalli Sathyanarayana Rao is hereby incorporated by reference in its entirety as though fully and completely set forth herein. The last n-talker mode may allow primary endpoint 151 and/or secondary endpoints 153 to support more videoconferencing endpoints in one or more of the videoconferences than the total number of input ports on the primary endpoint 151 and/or secondary endpoint 153 managing the videoconference. In some embodiments, the last-n talker mode may switch on automatically if the number of video inputs received by the primary endpoint 151 and/or secondary endpoints 153 reach or are approaching the number of available video decoders on the primary endpoint 151 and/or secondary endpoints 153. In some embodiments, the primary endpoint 151 and/or secondary endpoint 153 may support videoconferences with more endpoints 103 than video decoders available to the primary endpoint 151 and/or secondary endpoint 153 (e.g., using the n-talker method), but may need to limit the videoconference based on the number of available audio encoders (which may be greater than the number of available video decoders). In some embodiments, a participant may manually select last-n talker mode for one or more of the current videoconferences. In some embodiments, a shared encoder may be used for the non-last-n talkers.

As noted above, primary endpoint 151 may be operable to automatically discover one or more of endpoints 103*e-m* using an auto discovery method. Part of the discovery process may include primary endpoint 151 determining one or more characteristics of the discovered endpoints and using the determined characteristics to choose an endpoint to pass the one or more endpoints to in the videoconference. Characteristics may include a maximum available bandwidth, a number of multipoint ports, IP capabilities, Primary Rate Interface (PRI) information, ISDN information, Basic Rate Interface (BRI) information, V.35 capability, V.35 Speed, Encryption Capability, public switch telephone network (PSTN) capability, cellular telephone capability, general packet radio service (GPRS) capability, 3G mobile capability, and/or if a user has subscribed to a service. Other characteristics may include a station name (e.g., of endpoint 103), information regarding users that use endpoint 103 (e.g., names, addresses, locations, phone numbers, email addresses, etc.), information regarding the company name that owns or operates endpoint 103 (e.g., names, addresses, locations, phone numbers, email addresses, etc.), an IPv4 Address/Mask, an IPv6 Address, a station capability string, a list of known endpoints 103 (e.g., in a destination subnet and/or otherwise), a list of possible or suspected endpoints 103, a list of unresponsive endpoints 103, and/or other information.

In some embodiments, primary endpoint 151 may seamlessly pass communications of one or more of endpoints 103 to secondary endpoint 153 such as secondary endpoint 153 previously discovered or pre-designated by a videoconference participant such that participants in the videoconference may not be aware that a switch has been performed. In some embodiments, primary endpoint 151 may contact secondary endpoint 153 and may then pass communications from endpoints 103 to secondary endpoint 153 by having endpoints 103 send their video (and/or audio) to a different address (e.g., the IP address of secondary endpoint 153). Primary endpoint 151 may provide configuration information for endpoints 103 to secondary endpoint 153. Configuration information for the endpoint 103 may include, for example, video codec type, audio codec type, IP address, video resolution, video layout preference, and supported bandwidth (other configuration information may also be used). In some embodiments, a user may specify the other primary endpoint 151 or secondary endpoint 153 to use to manage the additional inputs (e.g., prior to or during the videoconference).

At 309, secondary endpoint 153 may manage at least a portion of the videoconference. In some embodiments, secondary endpoint 153 (receiving part or all of the videoconference from primary endpoint 151) may be placed on reserve prior to the videoconference in order to seamlessly receive endpoints 103 involved in the videoconference if needed. In some embodiments, secondary endpoint 153 may not be placed on reserve, but may instead be located by primary endpoint 151 as an endpoint that is available and capable of supporting part or all of the videoconference.

Figure 3E:
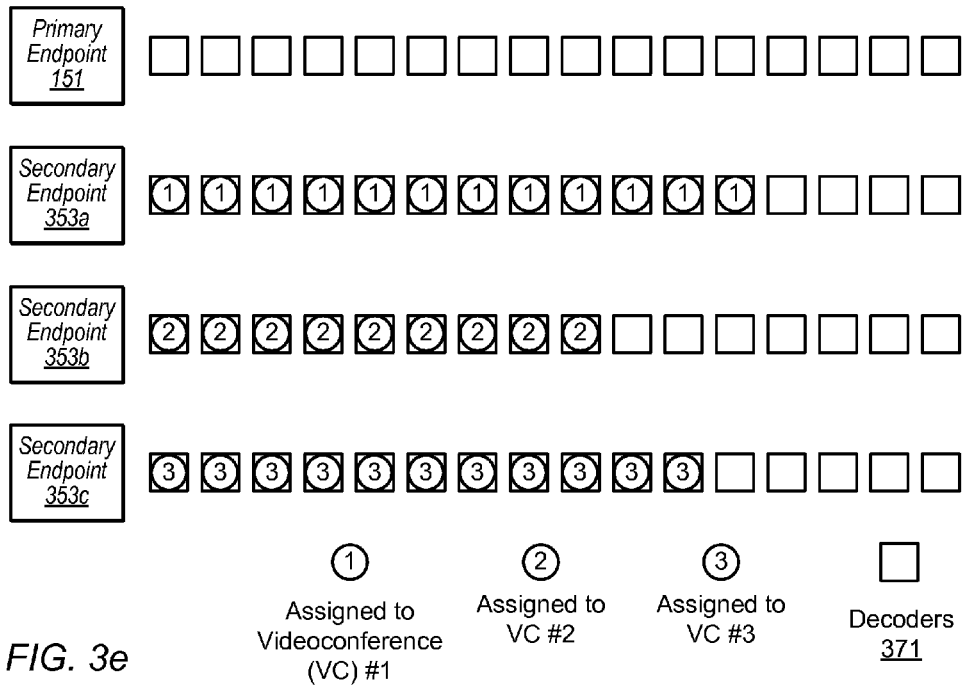
FIGS. 3e-f illustrate extended endpoint resources for multiple videoconference calls, according to an embodiment.

In some embodiments, a group of secondary endpoints 353*a-c* (secondary endpoints 353*a-c* may be embodiments of secondary endpoint 153) may be managed by primary endpoint 151. For example, two or more secondary endpoints 353*a-b* (e.g., with available decoders 371) may be managed through primary endpoint 151 operating as the contact endpoint for the group. When endpoint 103 initiates a videoconference, endpoint 103 may call into primary endpoint 151 and primary endpoint 151 may direct endpoint 103 to one of secondary endpoints 353*a-c* in the group. Endpoint 103 attempting to initiate the call may use the assigned secondary endpoint 353 as the central endpoint of the videoconference. Central secondary endpoint 353 may dial out to other endpoints 103 or receive requests from other endpoints 103 to join the videoconference. Primary endpoint 151 may operate as a signaling resource for secondary endpoints 353a-c in the group that may operate as secondary resources (in some embodiments, primary endpoint 151 may also operate as a secondary resource). As seen in FIG. 3e, secondary endpoints 353a-c may include multiple decoder resources. In some embodiments, one decoder per endpoint may be used in a videoconference call. For example, videoconference call #1 may include 12 endpoints that use 12 decoders 371 of secondary endpoint 353a; videoconference call #2 may include 9 endpoints that use 9 decoders 371 of secondary endpoint 353b; and videoconference call #3 may include 11 endpoints that use 11 decoders 371 of secondary endpoint 353c. In some embodiments, two or more of secondary endpoints 353 and/or primary endpoint 151 may be located together such that they can be daisy-chained. The daisy-chained primary endpoints 151 and/or secondary endpoints 153 may have a single point of entry (e.g., the primary endpoints 151 and secondary endpoints 153 may operate as a rack of MCUs that are accessed externally (e.g., through network 101) through a single IP address). In some embodiments, the primary endpoints 151 and/or secondary endpoints 153 may be accessed in an IVR (Intelligent Voice Routing) process. In some embodiments, secondary endpoints 353 and/or primary endpoint 151 may be located at different locations (and may communicate, for example, over a network).

Figure 3F:
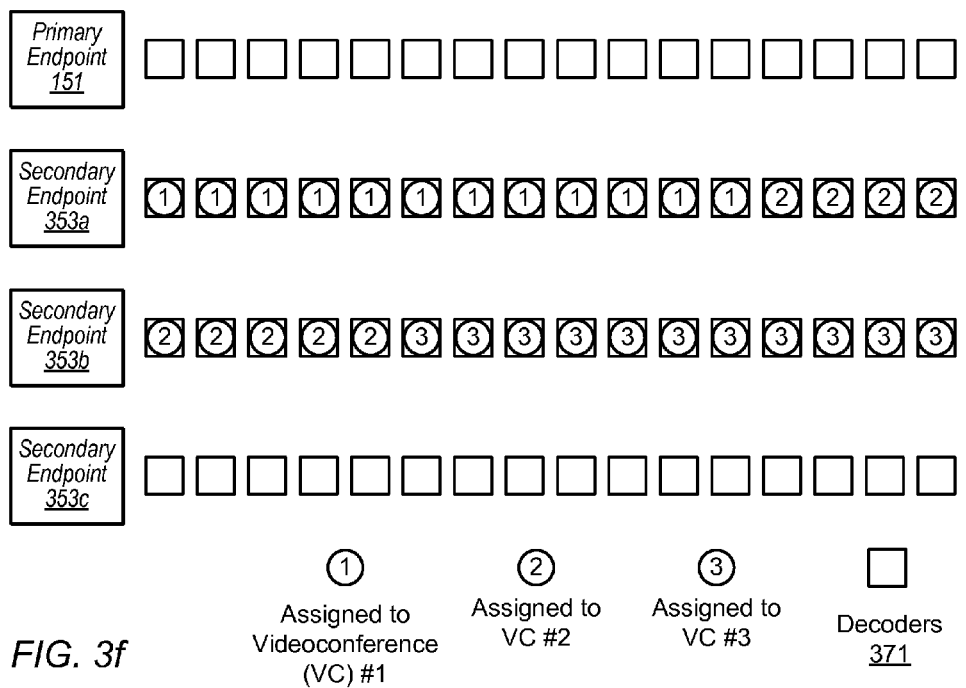
Figure 4A:
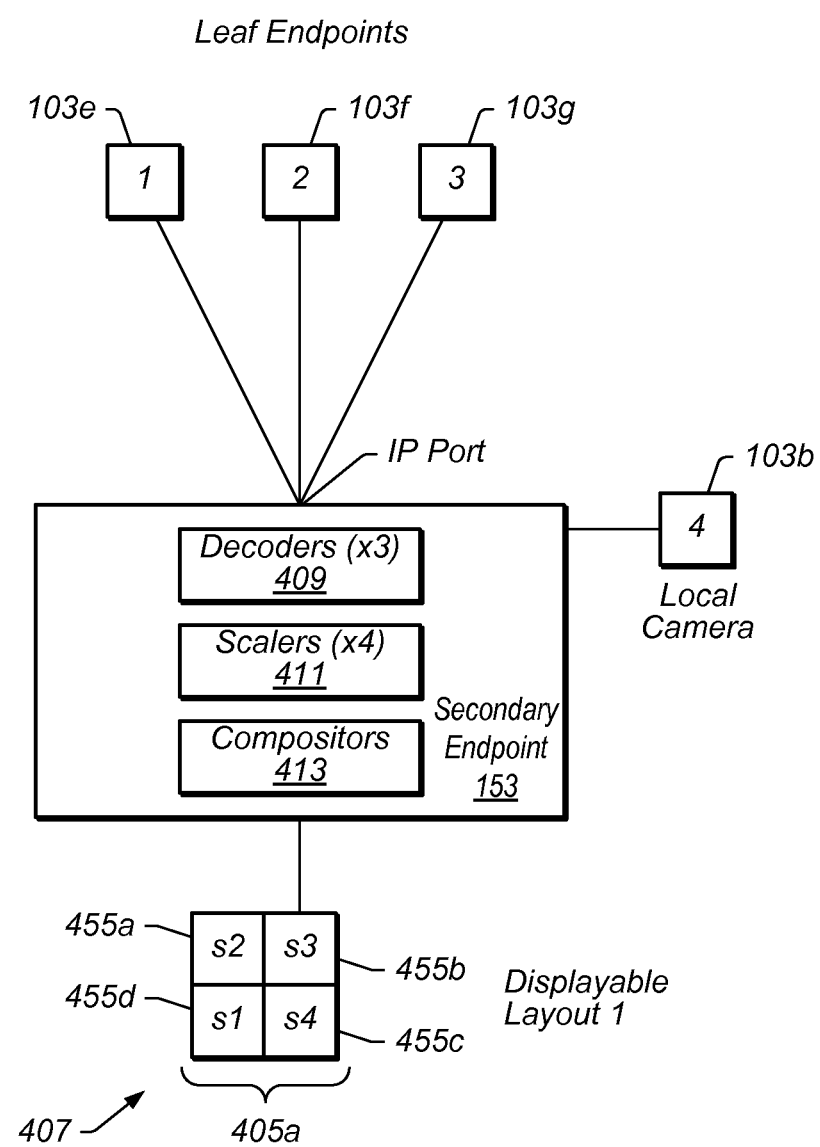
FIGS. 4a-d illustrate arrangements for encoders/decoders in videoconferencing endpoints, according to an embodiment.
Figure 4B:
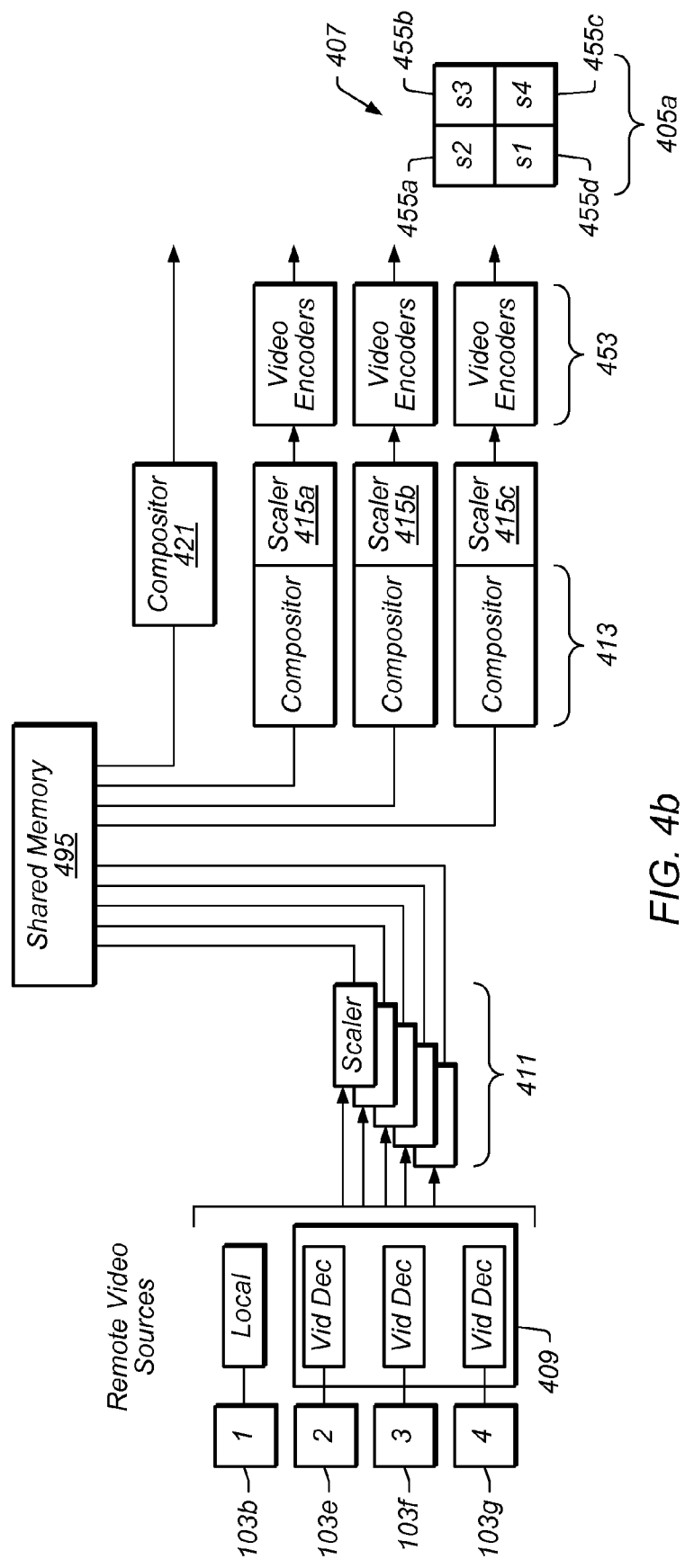
Figure 4C:
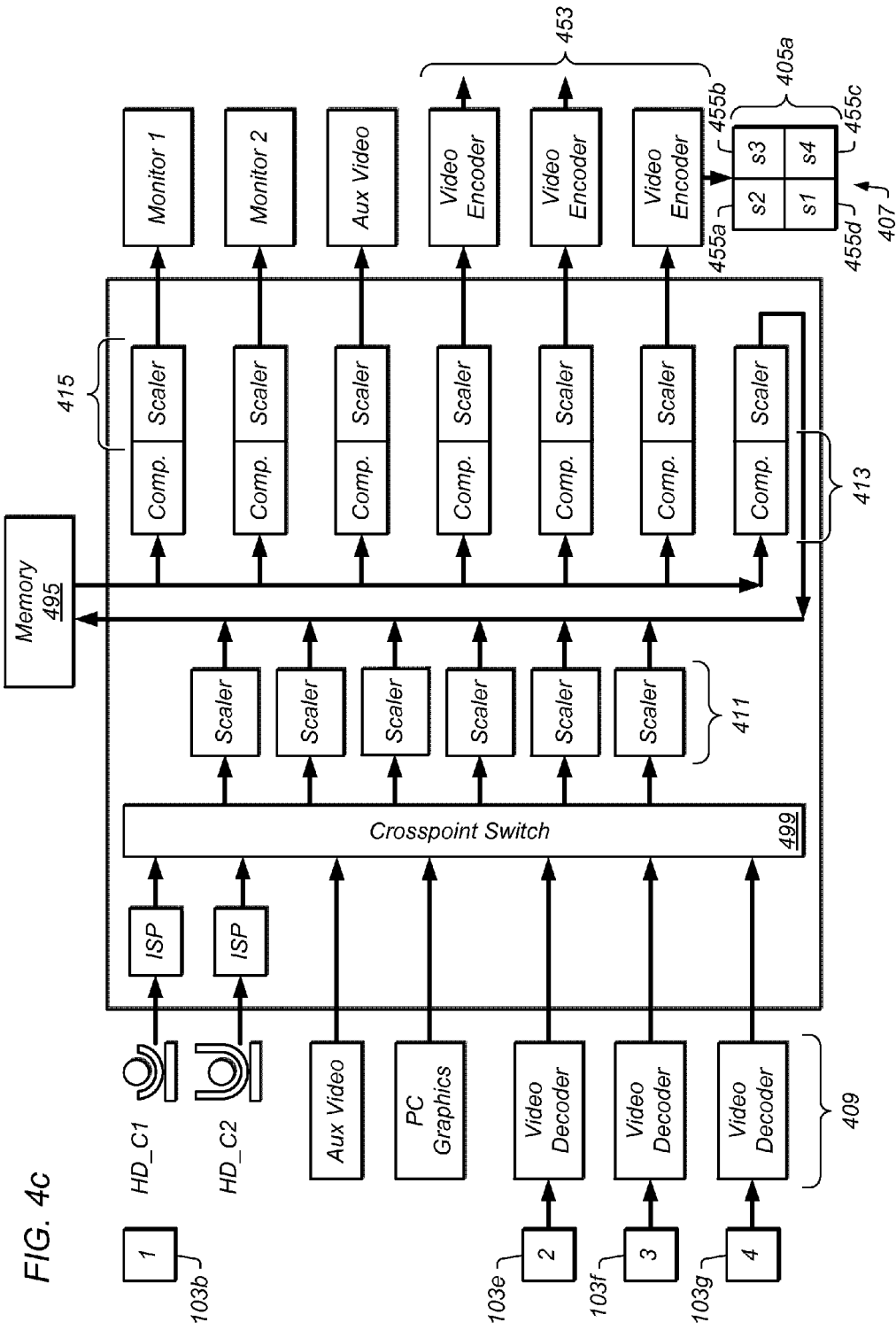
Figure 4D:
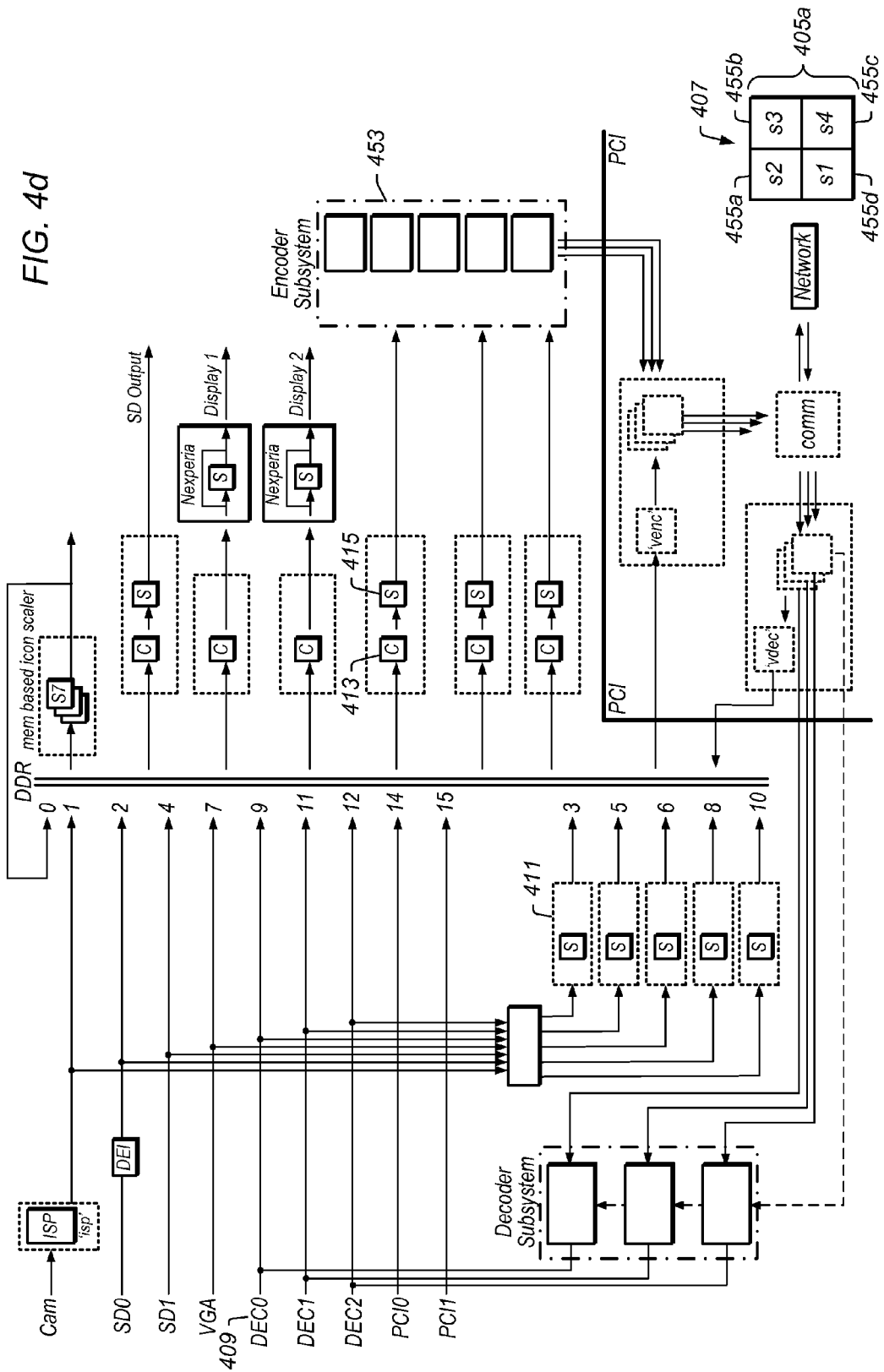

In some embodiments, primary endpoint 151 may assign/transfer endpoints 103 to secondary endpoints 353 using a stacked method. For example, primary endpoint 151 may organize videoconferences on several secondary endpoints 353 in a stacked method such that the decoders (or other resources such as input ports) of one secondary endpoint 353 are used before another secondary endpoint 353 is used to support videoconferences managed by primary endpoint 151. Using a stacked method, a single videoconference may actually be supported on multiple secondary endpoints 353. For example, as seen in FIG. 3f, videoconference call #1 may include 12 endpoints that use 12 decoders 371 of secondary endpoint 353a; videoconference call #2 may include 9 endpoints that use 4 decoders 371 of secondary endpoint 353a and 5 decoders 371 of secondary endpoint 353b; and videoconference call #3 may include 11 endpoints that use 11 decoders 371 of secondary endpoint 353b (leaving secondary endpoint 353c free, for example, to serve as a back-up secondary endpoint). As seen in FIGS. 3e-f, primary endpoint 151 may also have decoders 371 that may be used in one or more of the videoconference calls.

In some embodiments, primary endpoint 151 may allocate videoconferences on a first come first serve basis. For example, a new conference may be started on secondary endpoint 153 with the greatest number of resources (e.g., available decoders). In some embodiments, primary endpoint 151 may seamlessly pass (e.g., such that it is not readily evident to one or more participants of the videoconference) one or more endpoints 103 in a videoconference to one of secondary endpoints 153 if the videoconference surpasses the endpoint's capabilities.

In some embodiments, transitioning an endpoint's conference communications from primary endpoint 151 to secondary endpoint 153 may result in one or more side effects at the endpoint. For example, the video displayed at the endpoint may temporarily "freeze" or go blank. In some embodiments, the audio may have a silent pause. To address these side effects, in some embodiments, primary endpoint 151 may buffer video and/or audio from endpoints 103 in the videoconference to display/play during the switch to make the switch appear seamless (e.g., as the buffer ends, secondary endpoint 153 may begin sending video and/or audio). Other transitions are also contemplated. For example, in some embodiments, primary endpoint 151 may hold off switching until a momentary silence is detected in the audio (e.g., when there are no speakers in the videoconference). The temporary "freeze" or blank screen and silent audio moment may thus be less noticeable. In some embodiments, primary endpoint 151 may buffer the video and audio and wait for a pause in the audio to start buffer playback and affect the switch to secondary endpoint 153. Switching may involve secondary endpoint 153 contacting one or more of the endpoints that will switch or the endpoints being directed to contact secondary endpoint 153. Primary endpoint 151 may pass configuration parameters to secondary endpoint 153 for the endpoints that will be switched or endpoints 103 may provide this information to secondary endpoint 153 after the switch.

Figure 6:
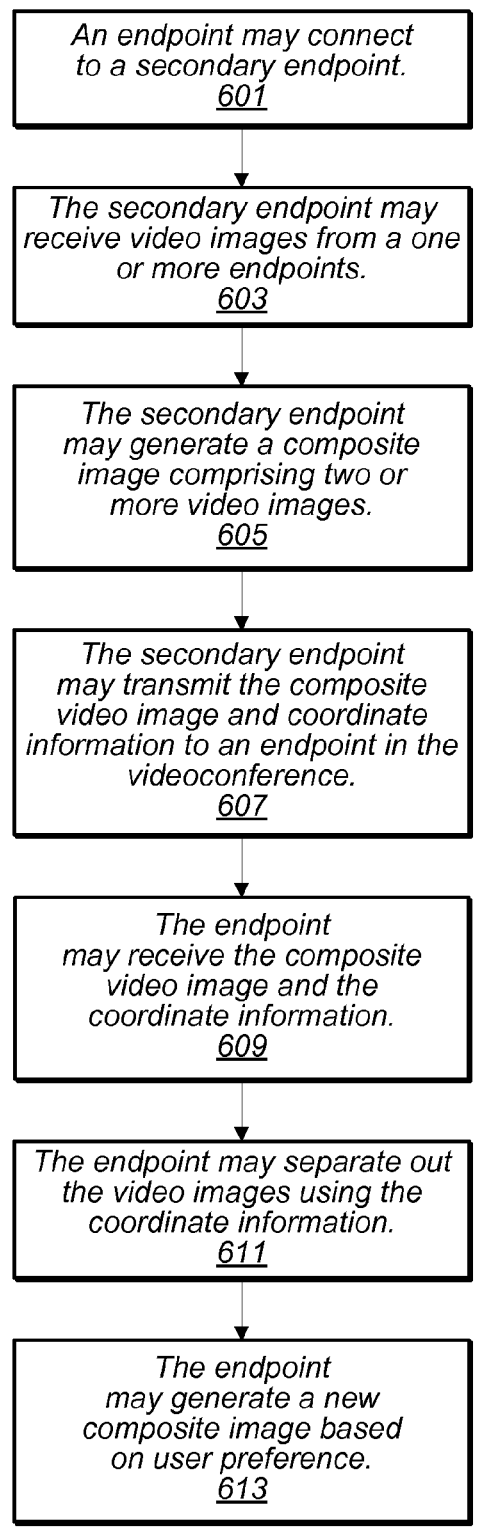
FIG. 6 illustrates a flowchart of a method for endpoint connection to a secondary endpoint and virtual decoder processing for a composite video image to display to a participant of the videoconference, according to an embodiment.

FIG. 6 illustrates a flowchart of a method of endpoint connection to secondary endpoint 153 and virtual decoder processing for a composite video image to display to a participant of the videoconference, according to an embodiment. It should be noted that in various embodiments of the methods described below, one or more of the elements described may be performed concurrently, in a different order than shown, or may be omitted entirely. Other additional elements may also be performed as desired.

At 601, endpoint 103 may connect to secondary endpoint 153 (e.g., through network 101). In some embodiments, endpoint 103 may call primary endpoint 151 and primary endpoint 151 may direct endpoint 103 to secondary endpoint 153 (e.g., by providing the endpoint 103 with an Internet Protocol (IP) address of secondary endpoint 153). In some embodiments, endpoint 103 may call secondary endpoint 153 directly. For example, endpoint 103 may have been provided the secondary endpoint IP address in advance of the videoconference. In some embodiments, control software implemented by primary endpoint 151, secondary endpoint 153, and/or endpoint 103 may predetermine a conference configuration and may send the appropriate secondary endpoint identification and/or contact information to endpoints 103 prior to the videoconference.

In some embodiments, a conference configuration may be determined using call statistics (e.g., call days/times, call lengths, number of participants per call, etc.) for one or more secondary endpoints 153. For example, call statistics may be maintained and used to predict which secondary endpoints 153 may be available at the time of a scheduled videoconference (e.g., call statistics may indicate that a specific secondary endpoint 153 is usually not being used on Thursday afternoons and, therefore, that specific secondary endpoint 153 may be a potential secondary endpoint 153 to use for a videoconference on Thursday afternoon). As another example, collected call statistics may indicate that secondary endpoints 153 with 10 decoders usually have at least 5 available decoders in the mornings between 9 am and 10 am. This availability may make this secondary endpoint 153 a potential secondary endpoint 153 for 5 decoders for videoconferences scheduled between 9 am and 10 am. In some embodiments, control software may analyze call statistics to determine potential secondary endpoints 153 to use and/or reserve for a videoconference. Other call statistics are also contemplated. In some embodiments, control software may determine primary endpoint 151, secondary endpoints 153, etc. for future videoconference calls or as videoconference calls are being received by primary endpoint 151 during the videoconference. In some embodiments, call statistics may also be used to reconnect endpoints 103 during a videoconference to a different secondary (or primary) endpoint. For example, if secondary endpoint 153 becomes unavailable, primary endpoint 151 may reassign endpoints 103 communicating through secondary endpoint 153 to a different secondary endpoint. For example, primary endpoint 151 may monitor a videoconference being managed by the secondary endpoint 153 and may contact the endpoints 103 in the videoconference with the new IP address. In some embodiments, the endpoints 103 may automatically contact the primary endpoint 151 if they are disconnected from the secondary endpoint 153 and cannot reconnect to the secondary endpoint 153.

At 603, secondary endpoint 153 may receive video images from one or more endpoints 103. Endpoints 103 may be remote or local and the video may include video images (e.g., from cameras) or presentations (e.g., from a Microsoft Powerpoint™ presentation). In some embodiments, secondary endpoint 153 (and/or primary endpoint 151) may also operate as an endpoint in the videoconference. For example, a camera local to the secondary endpoint 153 and/or primary endpoint 151 may send video of local participants to the secondary endpoint 153 and/or primary endpoint 151. Participants may also interact with other videoconferencing equipment local to the secondary endpoint 153 and/or primary endpoint 151 (e.g., monitors, speakers, etc). In some embodiments, secondary endpoint 153 may use one or more decoders 409 to decode received video images 455 (e.g., separate video images 455a, 455b, 455c, 455d, etc. from respective endpoints). For example, video packets for the video frames including the respective received video images 455 may be assembled as they are received (e.g., over an Internet Protocol (IP) port) into secondary endpoint 153. FIGS. 4a-d illustrate embodiments of secondary endpoints 153. In some embodiments, multiple secondary endpoints 153 may be involved in the videoconference. In some embodiments, endpoints 103 may connect to primary endpoint 151 without intervening secondary endpoint 153.

Figure 10:
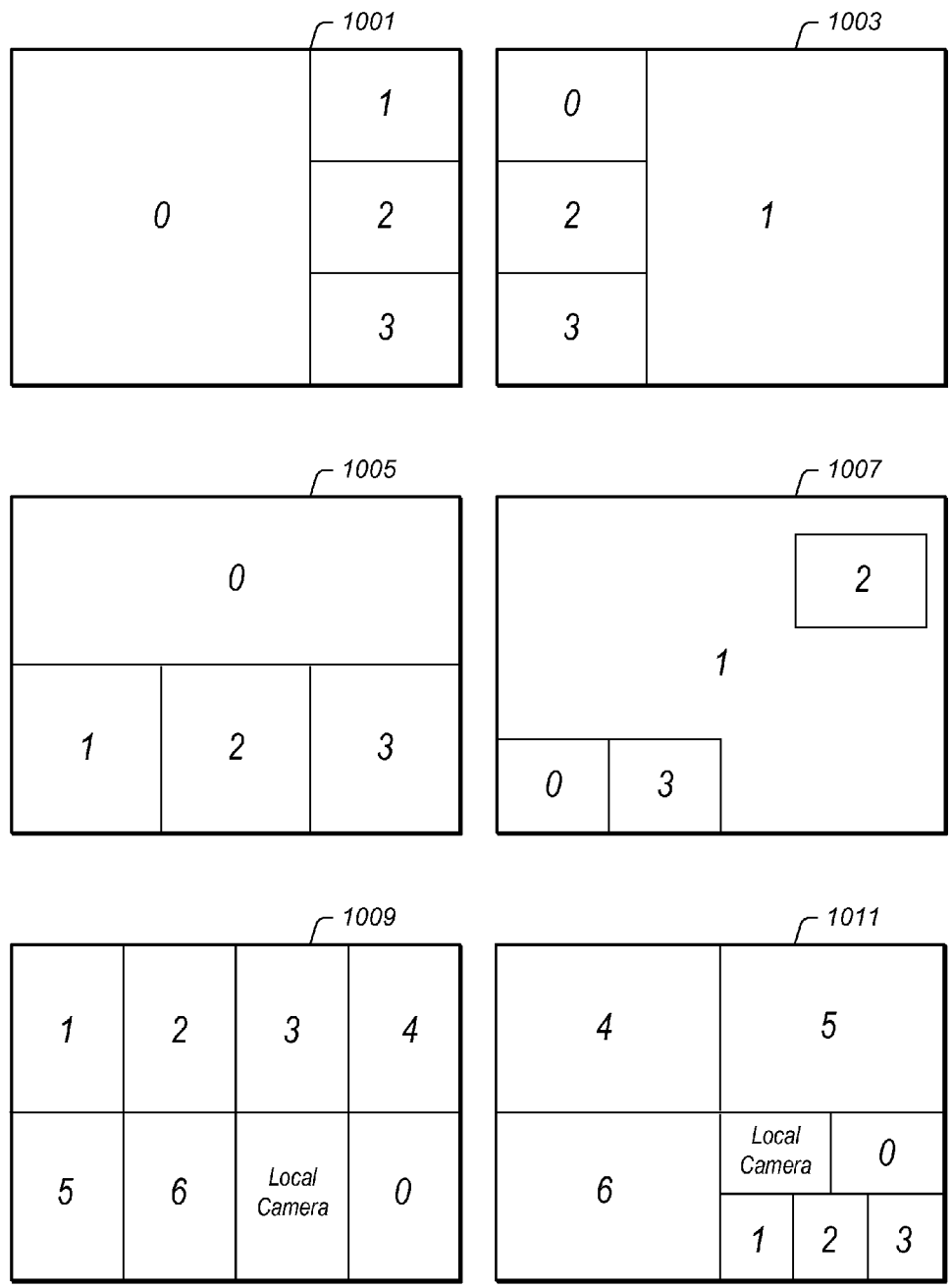
FIG. 10 illustrates various video image layouts, according to various embodiments.

In some embodiments, endpoint 103 may provide one or more endpoint characteristics to secondary endpoint 153 (e.g., video resolution, audio encoding format, etc. supported by the endpoint 103) and/or primary endpoint 151. In some embodiments, secondary endpoint 153 and/or primary endpoint 151 may also receive composite image layout preferences from the endpoints 103. For example, endpoint 103 may receive a composite image layout preference from one or more videoconferencing participants (e.g., through a menu on an on-screen interface) and may transmit that preference to secondary endpoint 153 and/or primary endpoint 151. If sent to the primary endpoint 151, the primary endpoint 151 may relay the characteristics/preferences to the secondary endpoint 153. In some embodiments, a button on remote 250 may allow a videoconference participant to cycle through two or more available layout preferences. The composite image layout preference may include a layout type (e.g., layout 1001, 1003, 1005, 1007, 1009, or 1011 as seen in FIG. 10). Other layout types are also possible. The composite image layout preference may specify which endpoint's video image to place in each of the available layout positions (e.g., which endpoint video image should be placed in the main layout position and which endpoint video images should be placed in the other layout positions). In some embodiments, secondary endpoint 153 and/or primary endpoint 151 may not receive a video image layout preference from one or more endpoints 103. In some embodiments, the video image layout preference may be generated at secondary endpoint 153 or primary endpoint 151. For example, control software implemented on secondary endpoint 153 or primary endpoint 151 may determine which endpoint 103 has the current speaker and may place the corresponding video image in a main video image window of the layout (e.g., with other endpoint video images arranged around the main video image). Other layout selections are also contemplated.

In some embodiments, secondary endpoint 153 and/or primary endpoint 151 may also be operable to receive other information from endpoints 103. For example, endpoints 103 may send data to secondary endpoint 153 and/or primary endpoint 151 to move a far end camera (e.g., on another endpoint 153). Secondary endpoint 153 and/or primary endpoint 151 may subsequently transmit this information to respective endpoint 153 to move the far end camera.

Figure 9:
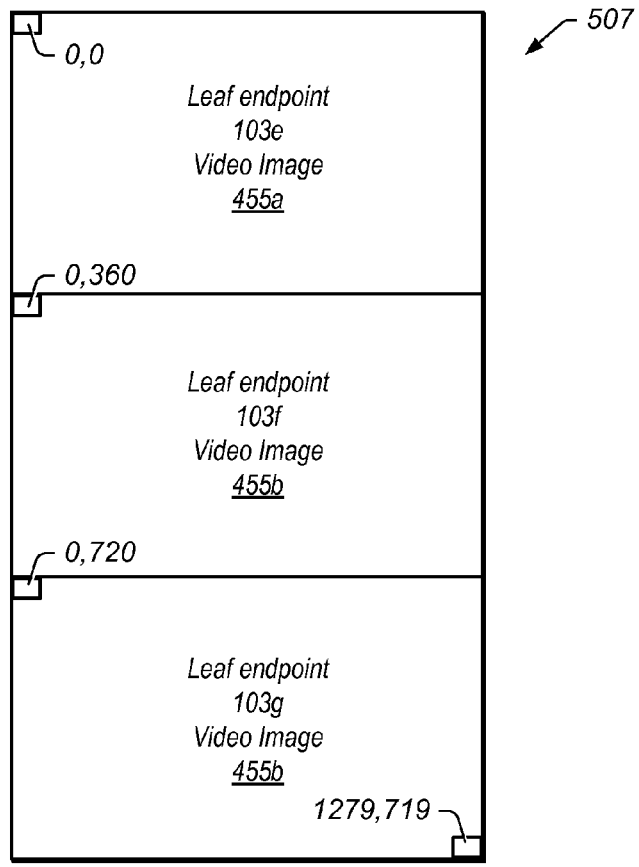
FIG. 9 illustrates a coordinate system for a video frame, according to an embodiment.

At 605, secondary endpoint 153 may generate composite video image 407 with two or more video images 455 (e.g., from endpoints 103 and/or a camera local to secondary endpoint 153). In some embodiments, secondary endpoint 153 may have multiple scalers 411 and compositors 413 to scale received video images 455 and composite two or more of video images 455 (e.g., from endpoints 103) into, for example, layout 405a. In some embodiments, layout 405a may include video image 455 from each endpoint 103 communicating with secondary endpoint 153. In some embodiments, layout 405a may be in a predetermined format. For example, if connected to three endpoints 103, the video image 455 of each endpoint 103 may be scaled to a 1280 by 360 (pixel) image and composite video image 407 (e.g., including the three images stacked as seen in FIG. 9) may have dimensions of 1280 by 1080. Other formats are also contemplated.

In some embodiments, scalers 411 may be coupled to video decoders 409 (e.g., through crosspoint switch 499 shown in FIG. 4b) that decode video images 455 from the various video sources (e.g., endpoints 103). Scalers 411 may scale video images 455 after video images 455 are decoded. In some embodiments, one or more of video images 455 may not be scaled. For example, the two or more video images 455 may be rearranged into composite video image 407a without being scaled. In some embodiments, scalers 411 may be 7-15 tap scalers. Scalers 411 may use linear combinations (e.g., with similar or different coefficients) of a plurality of pixels in video image 455 for each pixel scaled. Other scalers 411 are also contemplated. In some embodiments, video images 455 may be stored in shared memory 495 after being scaled.

In some embodiments, secondary endpoint 153 may determine the coordinates of video images 455 in composite video image layout 405a. For example, coordinate information 519 may indicate the start/stop locations of one or more of video images 455 in video frame 507. This coordinate information 519 may be stored on secondary endpoint 153. In some embodiments, the coordinates may be predetermined. For example, a standard format with standard start/stop coordinates may be used for the images in composite video image 407 such that coordinate information 519 may not need to be sent to receiving primary endpoint 151 that is expecting composite video image 407 in standard format.

In some embodiments, compositors 413 may access video images 455 (e.g., from shared memory 495) to form composite video images 407. In some embodiments, endpoint 103 may composite video images 455 into one or more respective video image layouts (e.g., as requested by respective endpoints 103). For example, endpoint 103 may composite two or more of received video images 455 into composite video image 407 with continuous presence layout 405a.

In some embodiments, the output of compositors 413 may again be scaled (e.g., by scalers 415) prior to being encoded by video encoders 453. The video data received by scalers 415 may be scaled according to the resolution requirements of respective endpoint 103. In some embodiments, the output of compositor 413 may not be scaled prior to being encoded and transmitted to endpoints 103. In some embodiments, composite video image layout 405a may be displayed.

In some embodiments, secondary endpoint 153 and primary endpoint 151 may coordinate processing to generate a composite video image layout 405a. For example, secondary endpoint 153 may send one or more video images 455 to primary endpoint 151 which may then composite the video images 455 with other video images from other endpoints 103. The primary endpoint 151 may send the composite video image 407 to the secondary endpoint 153 for distribution (or may send the composite video image 407 directly to the endpoints 103 of the videoconference).

At 607, secondary endpoint 153 may transmit composite video image 407 and coordinate information 519 to one or more endpoints 103 in the conference. In some embodiments, secondary endpoint 153 may not transmit coordinate information 519 to endpoint 103 (e.g., if composite video image 407 is in a standard format such that endpoint 103 may predict the coordinates of the video images in the composite video image 407). Coordinate information 519 may identify the locations of specific video images 455 in received composite video image layout 405a. In some embodiments, coordinate information 519 may be transmitted as metadata 901 (e.g., see FIG. 9) with composite video image layout 405a. Metadata 901 may include coordinate information 519 for video frame 507 with the start (and/or stop) information for respective video images 455 (e.g., video image boundaries and/or pixel start/stop points) corresponding to endpoints 103 (and/or secondary endpoint 153). Metadata 901 may also include attributes of each of the plurality of endpoints 103 including identifying information respective to corresponding endpoints 103 for each video image 455. Other information in metadata 901 is also contemplated. In some embodiments, coordinate information 519 may be sent in a form other than metadata.

At 609, endpoint 103 may receive composite video image 407 and coordinate information 519 (e.g., in metadata 901). Video frame 507 including two or more video images 455 may be received. Video frame 507 may be received as a series of video packets 503 in video stream 500 at decoder 515. Decoder 515 may assemble video packets 503 into their respective video frames 507 for further processing in virtual decoder 517. As noted above, in some embodiments, coordinate information 519 may not be received with composite video image 407.

At 611, endpoint 103 may separate out video images 455 using coordinate information 519. Virtual decoders 517 at endpoints 103 may separate continuous presence layout 405a into two or more separate video images 455. In some embodiments, coordinate information 519 may be used to find video image boundaries of video images 455 within video frame 507. In some embodiments, coordinate information 519 may be used to determine where video images 455 start and stop in video frame 507. These start/stop locations may be used by virtual decoder 517 to separate video images 455 from video frame 507. In some embodiments, the separate video images 455 may be defined and/or scaled out of composite video image 407. For example, coordinate information 519 may be used by virtual decoder 517 to crop respective video images 455 (e.g., video images 455a and 455b) in video frame 507. In some embodiments, separating video images 455 may include, for example, storing separated video images 559 in separate locations of a memory. In some embodiments, separating video images 455 may include storing start and/or stop locations of separated video images 455 in a memory. Other means for separating video images 455 are also contemplated.

In some embodiments, virtual decoder 517 may be implemented as a software abstraction on hardware such as a field programmable gate-array (FPGA) or other processor. In some embodiments, one or more virtual decoders 517 may be implemented on a single ASIC (Application Specific Integrated Chip). Other virtual decoder configurations are also contemplated. In some embodiments, a separate processor may implement virtual decoder 517 by issuing commands to reprogram at least one FPGA to implement virtual decoder 517. Other configurations are also contemplated.

At 613, scalers 513 and compositors 515 may access video images 455 to form a new composite video image layout 405b. In some embodiments, endpoint 103 may composite video images 455 (and, for example, a local video image 555 from a local camera) into one or more respective video image layouts (e.g., as requested by respective endpoints 103). For example, endpoint 103 may composite two or more of received video images 455 into composite video image layout 405b. In some embodiments, composite video image layout 405b may be displayed.

Figure 8A:
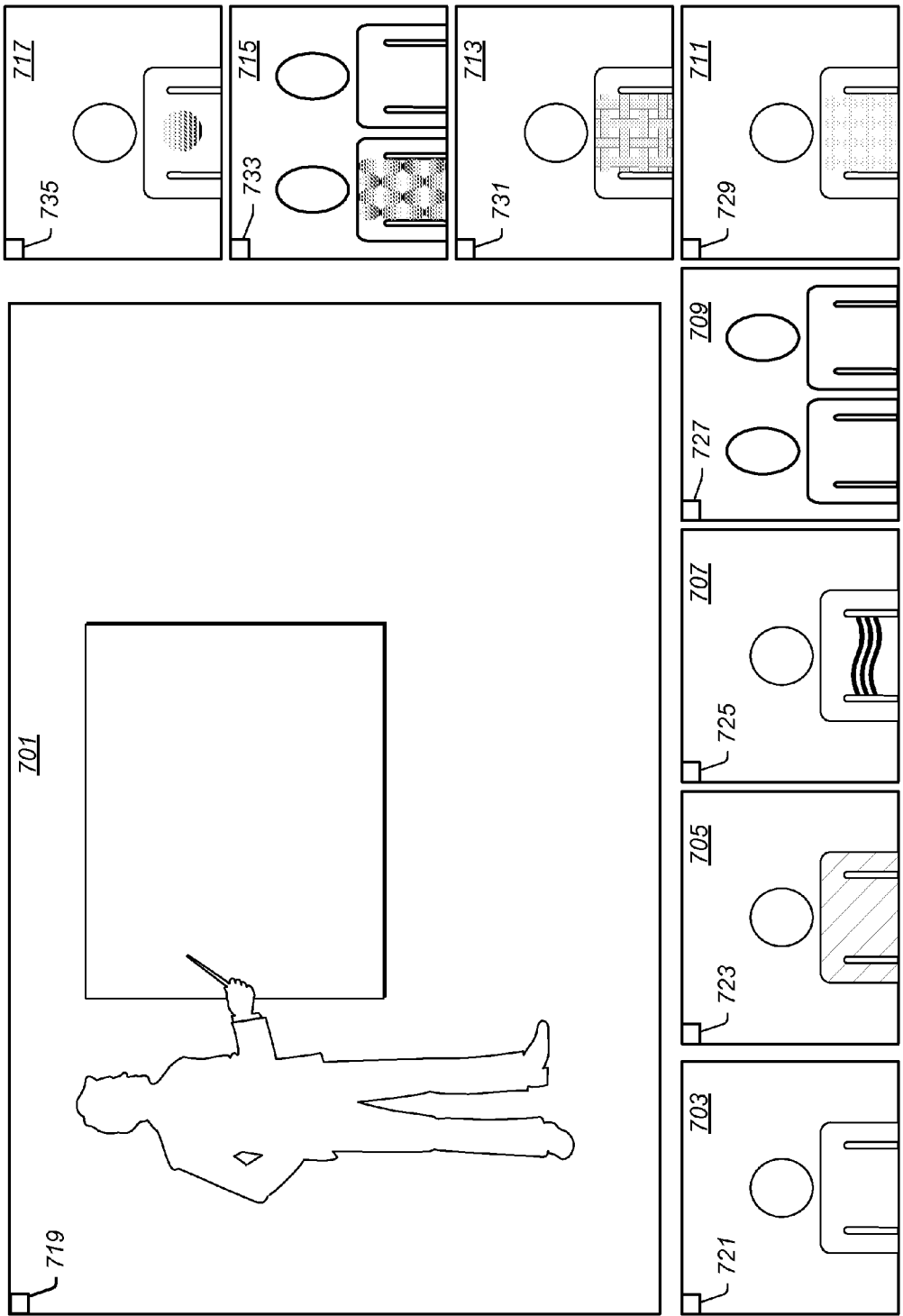
FIG. 8a illustrates separated video images for arrangement in a new video layout, according to an embodiment.

In some embodiments, endpoint 103 may separate out video images 455 of composite video image 407 and form a different composite video image 407 to display. For example, endpoint 103 may generate new composite video image 407 based, for example, on user preference. As seen in FIG. 8a, coordinate information 519 for coordinates 719-735 may be sent with the composite layout video frame and used by virtual decoder 517 (e.g., at endpoint 153) to separate video images 455 into separated video images. In some embodiments, one or more of the separated video images may be provided to one or more scalers 513. The video images (including scaled video images, if any) may then be provided to one or more compositors 515. One or more compositors 515 may composite video images 455 into video image layout 405 requested by a local participant through endpoint 153. In some embodiments, a local participant may cycle through the layout offerings from endpoint 153 (e.g., by clicking an icon to cycle to the next available layout). In some embodiments, scalers 513 and compositors 515 may be implemented in hardware or software. In some embodiments, icon scalers may be used (e.g., if all of the endpoint's other scalers are being used).

FIG. 9 illustrates an example of a use of coordinate information 519 to locate the boundaries of three video images (e.g., video images 455a-c) in order to separate video images 455. For example, endpoint 103e video image 455a may have a left boundary at 0, a top boundary at 0, a right boundary at 1279, and a bottom boundary at 359. Similarly, endpoint 103f video image 455b may have a left boundary at 0, a top boundary at 360, a right boundary at 1279, and a bottom boundary at 719. Coordinate information 519 (e.g., boundary information) for other video images (e.g., video image 455b) may also be provided e.g., in metadata 901. In some embodiments, the three video images may be "stacked" in time (e.g., sent/received sequentially but not in same composite video image 407). Other embodiments of compositing images are also contemplated.

Figure 5:
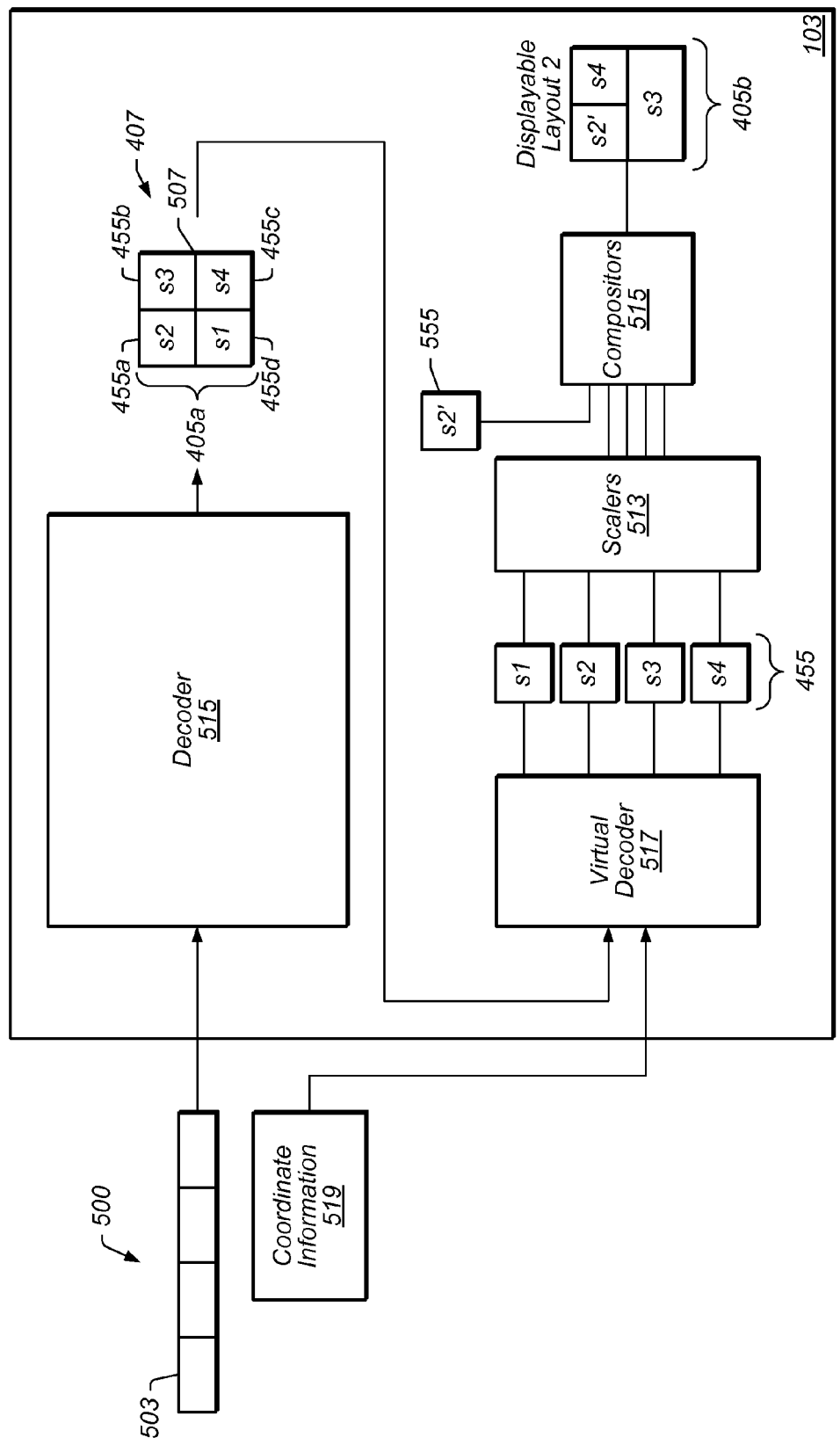
FIG. 5 illustrates an overall view of the re-compositing process including a virtual decoder, according to an embodiment.

While three video images 455 are shown with respect to video frame 507, it is noted that video frame 507 may include other combinations of two or more video images 455 and video images 455 may be in a different layout than shown in FIG. 5. For example, video frame 507 may include two video images (e.g., each 640 by 360 pixels) arranged side by side in a 1280 by 360 pixel video frame. Video frame 507 may then be separated into two 640 by 360 pixel video images. Other video image/video frame configurations are also contemplated.

Figure 7:
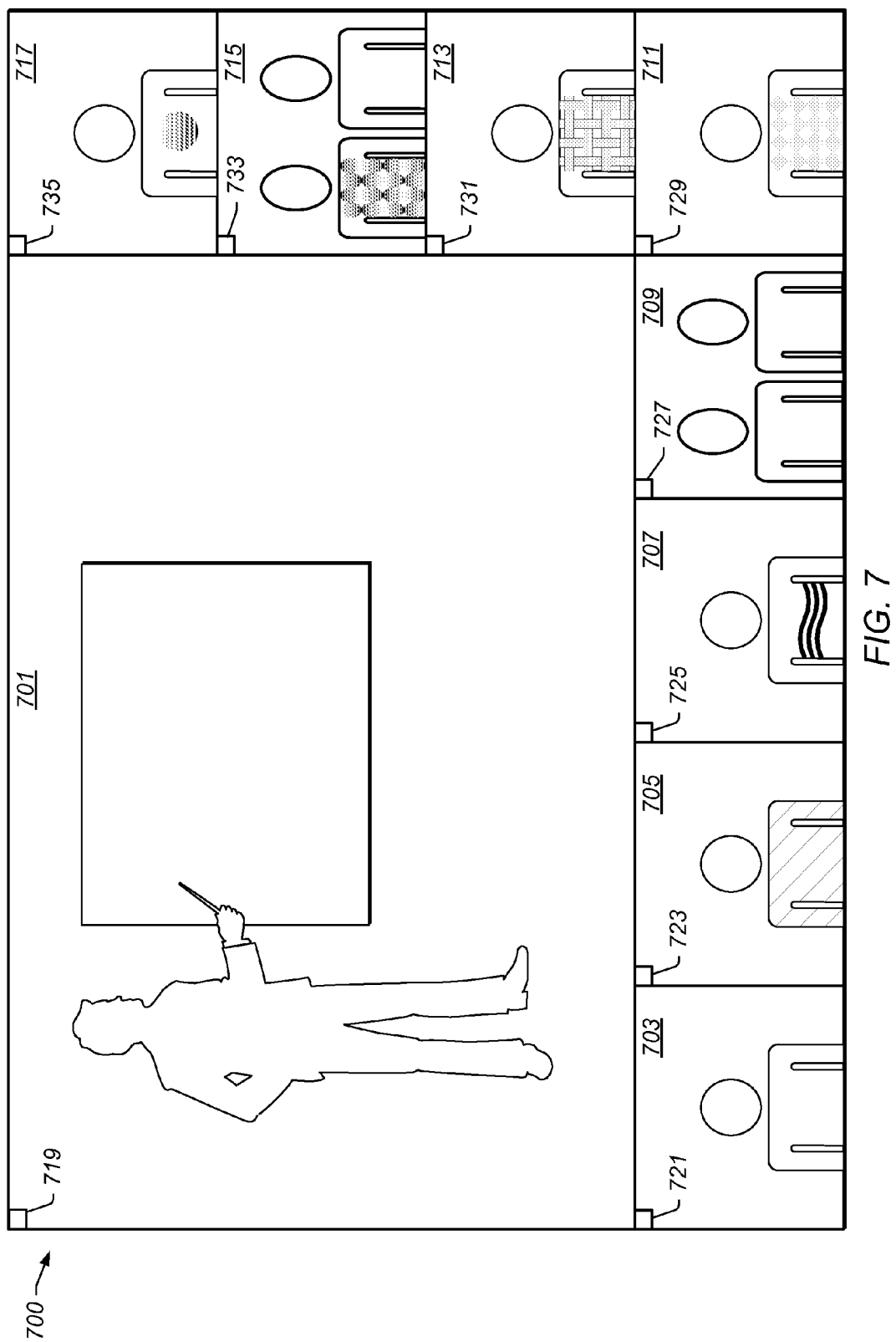
FIG. 7 illustrates a video image layout, according to an embodiment.

As seen in FIG. 7, composite layout 700 may include nine video images 701, 703, 705, 707, 709, 711, 713, 715, and 717 originating from respective endpoints 103e-m (e.g., video image 701 from endpoint 103e, video image 703 from endpoint 103f, etc.). Composite layout 700 may include main video image 701 of the endpoint with the current speaker and one or more side video images (e.g., side video images 703-717) of other endpoints participating in the videoconference. In some embodiments, if main video image 701 and two side video images 707 and 709 are placed in video image layout 800 (see FIG. 8b) with equal sized video images, main video image 701 may be scaled down and two side video images 703 and 705 may be scaled up (or not scaled at all). Other scaling combinations are also contemplated. In some embodiments, the separated video images may not be scaled (e.g., the separated video images may be only rearranged). In some embodiments, scaling may include changing the ratio of the outer dimensions of an image.

In some embodiments, endpoint 103 may form a new video image layout 405b that includes its current local video image 555 as one of the video images. In some embodiments, the layout of the received video image layout 405a and the new video image layout 405b may be the same (and, for example, one or more of the video images may be changed). For example, the video image corresponding to the local video image may be separated and the current local video image 555 may be placed into composite video image 407 in place of the previous local video image (current local video may be more current than the local video originally sent to secondary endpoint 153 and received in composite video image layout 405a).

In some embodiments, endpoint 103 may display new composite video image layout 405b and/or composite video image 407 from primary endpoint 151. FIG. 8b illustrates an example of new video image layout 800 with three video images 701, 707, and 709 on display. FIG. 10 illustrates other possible video image layouts, according to various embodiments. Other video image layouts are also contemplated. In some embodiments, metadata 901 may be displayed (e.g., with each respective video image in the video image layout).

Figure 11:
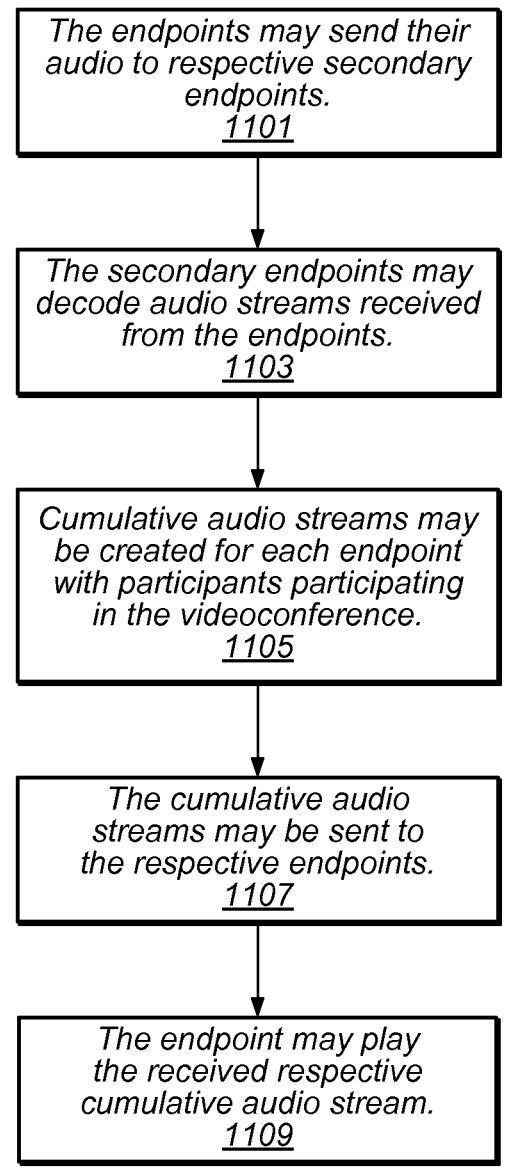
FIG. 11 illustrates a flowchart of a method for audio management for extended endpoint resources, according to an embodiment.

FIG. 11 illustrates a flowchart of a method for audio management for extended endpoint resources, according to an embodiment. It should be noted that in various embodiments of the methods described below, one or more of the elements described may be performed concurrently, in a different order than shown, or may be omitted entirely. Other additional elements may also be performed as desired.

At 1101, endpoints 103 (e.g., endpoints 103e-j in FIG. 15) may send respective audio streams (e.g., 1541e-g) to a secondary endpoint 153. Audio from microphones at endpoint 103 may be encoded and sent in respective audio streams to respective secondary endpoints 153 for endpoints 103. In some embodiments, respective video streams 1501a-f may also be sent to secondary endpoint 153. Video streams 1501a-f may be sent in raw format from endpoint 103 to secondary endpoint 153. While a raw format may decrease latency in video display of the product video stream from endpoint 103, the raw format may require a higher bit rate.

At 1103, secondary endpoint 153 may decode the audio received from endpoints 103.

At 1105, cumulative audio streams (e.g., audio streams 1031a-f (referred generally as "cumulative audio stream 1551")) may be created for each participating endpoint 103 in the videoconference. Each respective cumulative audio stream 1551 may include the audio from one or more of the other endpoints 103 participating in the videoconference and may not include the audio of recipient endpoint 103. In some embodiments, secondary endpoint 153 may create each cumulative audio stream 1551 for each respective endpoint (e.g., endpoints 103e-j). Other audio stream arrangements are also contemplated.

At 1107, cumulative audio streams 1551 may be sent to respective endpoints 103. In some embodiments, secondary endpoint 153 may send a cumulative audio stream 1551 to respective endpoint 103. In some embodiments, secondary endpoint 153 may also send a composite video stream (e.g., that includes video images of multiple endpoints 103) to endpoints 103e-j (e.g., composite video stream 1553).

At 1109, endpoint 103 may play received respective cumulative audio stream 1551.

Figure 12:
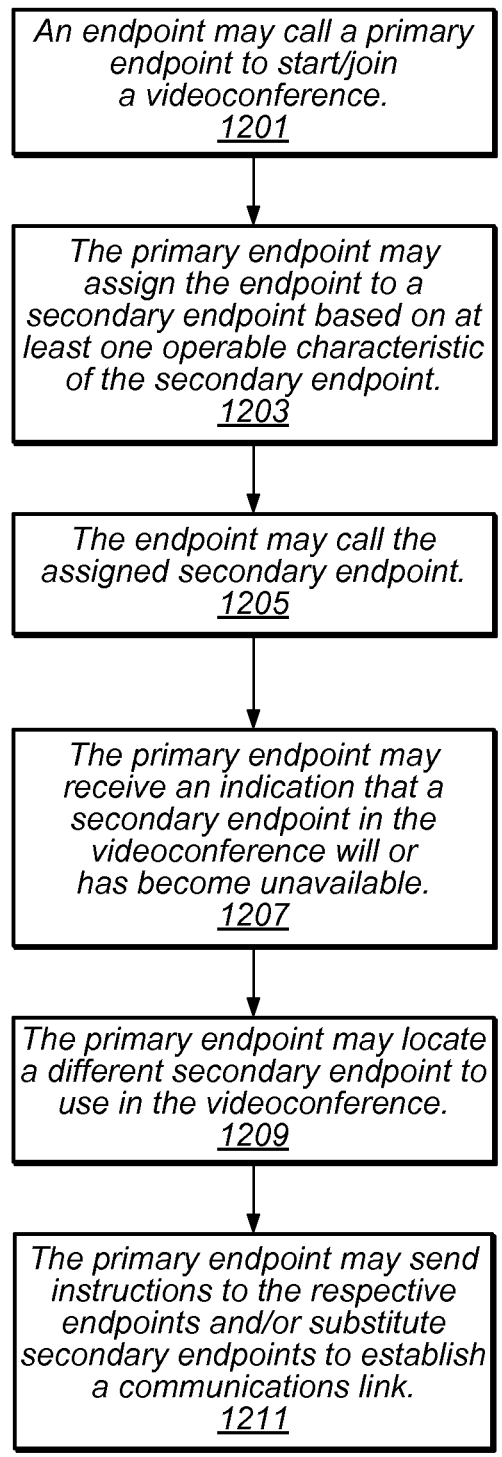
FIG. 12 illustrates a flowchart of a method for controlling a videoconference, according to an embodiment.

FIG. 12 illustrates a flowchart of a method for controlling a videoconference, according to an embodiment. It should be noted that in various embodiments of the methods described below, one or more of the elements described may be performed concurrently, in a different order than shown, or may be omitted entirely. Other additional elements may also be performed as desired.

At 1201, endpoint 103 may call primary endpoint 151 to start/join a videoconference.

At 1203, primary endpoint 151 may assign endpoint 103 to secondary endpoint 153 based on at least one operable characteristic of secondary endpoint 153. For example, the at least one operable characteristic may indicate a likelihood of secondary endpoint 153 being in use at a time of a current videoconference. Primary endpoint 151 may monitor secondary endpoints 153 (e.g., on a daily basis) and may determine usage patterns for each secondary endpoint 153. For example, primary endpoint 151 may discover that a particular secondary endpoint 153 is not used often during the afternoon. Primary endpoint 151 may then store an indicator noting that primary endpoint 151 may be able to use the particular secondary endpoint 153 in an afternoon videoconference. In some embodiments, primary endpoint 151 may also check the status of secondary endpoint 153 (e.g., by determining if secondary endpoint 153 is currently in a videoconference) prior to assigning endpoint 103 to secondary endpoint 153. In some embodiments, part of assigning endpoint 103 to secondary endpoint 153 may include sending an identification of respective secondary endpoint 153 and/or an access number/IP address for secondary endpoint 153 to endpoint 103.

At 1205, endpoint 103 may call assigned secondary endpoint 153.

At 1207, primary endpoint 151 may receive an indication that secondary endpoint 153 in the videoconference will or has become unavailable. For example, primary endpoint 151 may note a different videoconference that is scheduled to take place using secondary endpoint 153. In some embodiments, an individual (not in the current videoconference) may attempt to start using secondary endpoint 153 to start a different videoconference (e.g., by accessing a menu on secondary endpoint 153 to start a dialing process). In some embodiments, secondary endpoint 153 may send the indication (e.g., a digital message) to primary endpoint 151 indicating the interruption.

At 1209, primary endpoint 151 may locate a different secondary endpoint 153 to use in the videoconference. For example, primary endpoint 151 may analyze operable characteristics of other secondary endpoints 153 to locate a substitute secondary endpoint 153. In some embodiments, if a substitute secondary endpoint 153 cannot be located, the participants in the videoconference (all or a subset) may be notified of the problem. In some embodiments, endpoint 103 that is about to be interrupted may display a message regarding the current videoconference and the individual about to start a new videoconference may hold off until the current videoconference is concluded. In some embodiments (e.g., during high priority videoconferences) secondary endpoints 153 may not allow an individual to use secondary endpoint 153 until the current videoconference has concluded.

At 1211, primary endpoint 151 may send instructions to respective endpoints 103 and/or substitute secondary endpoint 153 to establish a communications link. For example, endpoints 103 may hang up with current secondary endpoint 153 and call substitute secondary endpoint 153. In some embodiments, substitute secondary endpoint 153 may initiate the videoconference with respective endpoints 103. In some embodiments, the new communication link may be established with little interruption to the videoconference. For example, during the call initiation, the current video frame may be frozen on the screen until a new video image is received when the new communication link is established. In some embodiments, the participants at respective endpoints 103 may or may not be notified of the secondary endpoint switch.

Note that the videoconferencing system(s) described herein (e.g., videoconferencing endpoints 103) may be a dedicated videoconferencing system (i.e., whose purpose is to provide videoconferencing) or a general purpose computer (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 2) or simple (e.g., a user computer system with a video camera, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic secondary, e.g., a hard drive, or optical storage. The memory medium may include other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for conducting a videoconference, comprising:
   a primary endpoint initially communicating directly with a plurality of endpoints in a videoconference; and
   the primary endpoint directing at least one endpoint of the plurality of endpoints to communicate directly with a secondary endpoint in the videoconference;
   wherein the secondary endpoint, or the primary endpoint and the secondary endpoint together, support the videoconference of the at least one endpoint by:
      receiving video images from the plurality of endpoints;
      compositing the video images to create a composite video image; and
      transmitting the composite image to the at least one endpoint.

2. The method of claim 1, wherein the primary endpoint directing the at least one endpoint comprises:
   making a switching determination during the videoconference; and
   the primary endpoint communicating switching instructions directly to the at least one endpoint or the secondary endpoint;
   wherein the at least one endpoint is operable to switch conference communications to the secondary endpoint, wherein switching conference communications to the secondary endpoint comprises sending or receiving the conference communications directly to the secondary endpoint.

3. The method of claim 2, wherein making a switching determination is based at least in part on a number of endpoints to support in the videoconference exceeding a number of input ports of the primary endpoint.

4. The method of claim 2, wherein making a switching determination is based at least in part on an external indication.

5. The method of claim 2, wherein communicating switching instructions comprises communicating switching instructions to the secondary endpoint that will manage videoconference communications with the at least one endpoint in the videoconference and the secondary endpoint communicating with the at least one endpoint to facilitate switching conference communications to the secondary endpoint.

6. The method of claim 1, further comprising the primary endpoint receiving video and audio from one or more of the plurality of endpoints communicating with the primary endpoint during the videoconference and providing a video and audio output to the one or more of the plurality of endpoints as part of the videoconference.

7. The method of claim 1, further comprising communicating configuration information for the at least one endpoint to the secondary endpoint.

8. A method for switching conference communications from a primary endpoint to a secondary endpoint in a videoconference, comprising:
a first endpoint in the videoconference receiving switching instructions directly from another endpoint, wherein the first endpoint is in the videoconference with the primary endpoint and the secondary endpoint, wherein the switching instructions are sent at least partially in response to a switching determination by the primary endpoint;
the first endpoint communicating directly with the secondary endpoint; and
the first endpoint switching conference communications from the primary endpoint to the secondary endpoint, wherein the secondary endpoint is operable to manage the videoconference with the first endpoint, wherein said managing the videoconference comprises:
receiving video images from a plurality of endpoints in the videoconference;
compositing the video images to create a composite video image; and
transmitting the composite image to the first endpoint.

9. The method of claim 8, wherein the first endpoint is a subset of a plurality of endpoints in the videoconference and wherein at least one other endpoint of the plurality of endpoints in the videoconference is operable to continue communications with the primary endpoint after the first endpoint switches communications to the secondary endpoint.

10. The method of claim 8, wherein the switching determination is based at least partially on a number of inputs required to support the videoconference exceeding a number of input ports available on the primary endpoint.

11. The method of claim 8, wherein the switching determination is based at least in part on receiving switching instructions from an external source.

12. The method of claim 8, wherein receiving switching instructions directly from another endpoint comprises receiving switching instructions directly from the primary endpoint.

13. The method of claim 8, wherein receiving switching instructions directly from another endpoint comprises receiving switching instructions directly from the secondary endpoint in the videoconference.

14. The method of claim 8, further comprising prior to receiving switching instructions, the first endpoint receiving video and audio from the primary endpoint and providing a video and audio output to the primary endpoint as part of a videoconference.

15. The method of claim 8, wherein the primary endpoint is operable to communicate configuration information for the first endpoint to the secondary endpoint.

16. A primary endpoint for use in a videoconference, the primary endpoint comprising:
at least one processor;
a memory coupled to the at least one processor and configured to store program instructions executable by the processor to:
communicate directly with one or more endpoints in a videoconference; and
direct at least one endpoint of a plurality of endpoints to communicate directly with a secondary endpoint in the videoconference;
wherein the secondary endpoint, or the primary endpoint and the secondary endpoint together, support the videoconference of the at least one endpoint by:
receiving video images from the plurality of endpoints;
compositing the video images to create a composite video image; and
transmitting the composite image to the at least one endpoint.

17. The primary endpoint of claim 16, wherein in directing the at least one endpoint, the primary endpoint is operable to:
make a switching determination during the videoconference; and
communicate switching instructions directly to the at least one endpoint or the secondary endpoint based on the switching determination;
wherein the at least one endpoint is operable to switch conference communications to the secondary endpoint based on the switching instructions, wherein switching conference communications to the secondary endpoint comprises sending or receiving the conference communications directly to the secondary endpoint.

18. The primary endpoint of claim 17, wherein the primary endpoint is operable to make the switching determination based at least in part on a number of endpoints to support in the videoconference exceeding a number of input ports of the primary endpoint.

19. The primary endpoint of claim 17, wherein the primary endpoint is operable to make the switching determination based at least in part on an external indication.

20. The primary endpoint of claim 17,
wherein in communicating switching instructions, the primary endpoint is operable to communicate switching instructions to the secondary endpoint that will manage videoconference communications with the at least one endpoint in the videoconference;
wherein the switching instructions are configured to cause the secondary endpoint to communicate with the at least one endpoint to facilitate switching conference communications to the secondary endpoint.

21. The primary endpoint of claim 16, wherein the program instructions are further executable to communicate configuration information for the at least one endpoint to the secondary endpoint.

* * * * *